(12) United States Patent
McDonough et al.

(10) Patent No.: US 8,181,905 B2
(45) Date of Patent: May 22, 2012

(54) AIRCRAFT ENGINE NACELLE WITH TRANSLATING INLET COWL

(75) Inventors: Michael Patrick McDonough, Anaheim, CA (US); Keith Towers Brown, Bonita, CA (US); Scott Gilzean, Oceanside, CA (US)

(73) Assignee: Rohr, Inc., Chula Vista, CA (US)

( * ) Notice: Subject to any disclaimer, the term of this patent is extended or adjusted under 35 U.S.C. 154(b) by 635 days.

(21) Appl. No.: 12/337,209

(22) Filed: Dec. 17, 2008

(65) Prior Publication Data

US 2010/0148012 A1   Jun. 17, 2010

(51) Int. Cl.
*B64D 33/02* (2006.01)

(52) U.S. Cl. .................. 244/53 B; 244/129.4; 137/15.1; 60/226.1

(58) Field of Classification Search .............. 244/53 B, 244/53 R, 129.4; 137/15.1, 15.2; 60/39.31, 60/226.1
See application file for complete search history.

(56) References Cited

U.S. PATENT DOCUMENTS

| | | | |
|---|---|---|---|
| 2,417,945 A | 3/1947 | Parker | |
| 3,067,968 A | 12/1962 | Heppenstall | |
| 4,442,987 A | 4/1984 | Legrand | |
| 5,014,933 A * | 5/1991 | Harm et al. | 244/53 B |
| 5,035,379 A | 7/1991 | Hersen | |
| 5,609,313 A | 3/1997 | Cole | |
| 6,179,249 B1 | 1/2001 | Canadas | |
| 6,340,135 B1 | 1/2002 | Barton | |
| 2010/0031629 A1 * | 2/2010 | Vauchel | 60/226.1 |
| 2010/0314501 A1 * | 12/2010 | Vauchel et al. | 244/53 B |

FOREIGN PATENT DOCUMENTS

| | | |
|---|---|---|
| FR | 2906568 A1 | 4/2008 |
| FR | 2916425 A1 | 11/2008 |
| FR | 2938236 A1 * | 5/2010 |
| FR | 2938237 A1 * | 5/2010 |
| FR | 2938238 A1 * | 5/2010 |
| GB | 2274490 A | 7/1994 |
| WO | 2009101273 A1 | 8/2009 |

OTHER PUBLICATIONS

Aircelle Safran Group, KATnet11—Drag Reduction for Nacelle Applications; document is believed available on-line but on unknown date; printed document is dated "Oct. 14, 2008"; pp. 1-25.
Extended European Search Report (EP 09015442.8), dated Aug. 30, 2011, pp. 1-7.

* cited by examiner

*Primary Examiner* — Benjamin P Lee
(74) *Attorney, Agent, or Firm* — Womble Carlyle

(57) ABSTRACT

A nacelle for a turbofan aircraft engine having a fan case with a fan case forward edge includes an inlet inner barrel having an inner barrel forward edge and an inner barrel aft edge. The inner barrel aft edge is configured to be affixed to the fan case forward edge in a stationary position on the engine. The nacelle also includes a translating inlet cowl having an inlet lip with an aft inlet lip edge and an outer skin with rear edge. The translating inlet cowl is configured to be movably attached to one or more stationary portions of the engine such that the inlet cowl is selectively movable between a stowed flight position and an extended service position.

29 Claims, 26 Drawing Sheets

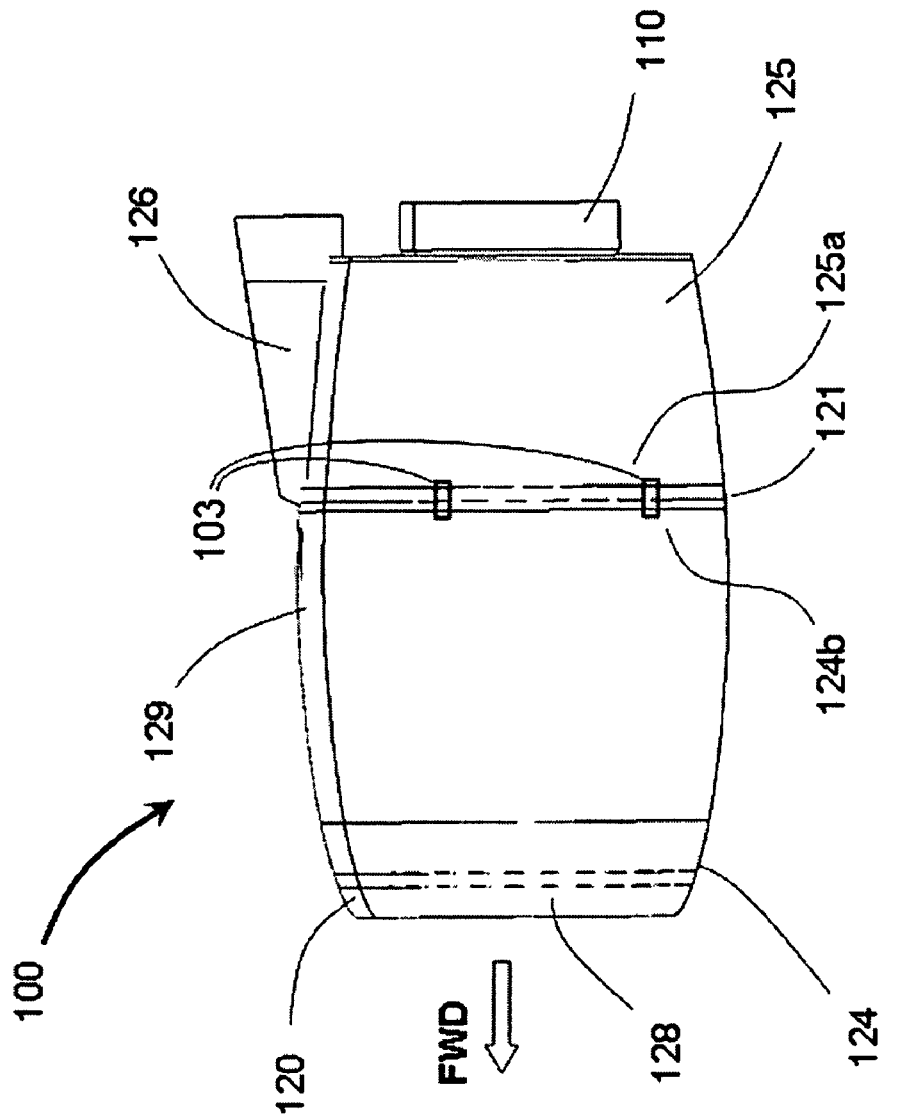

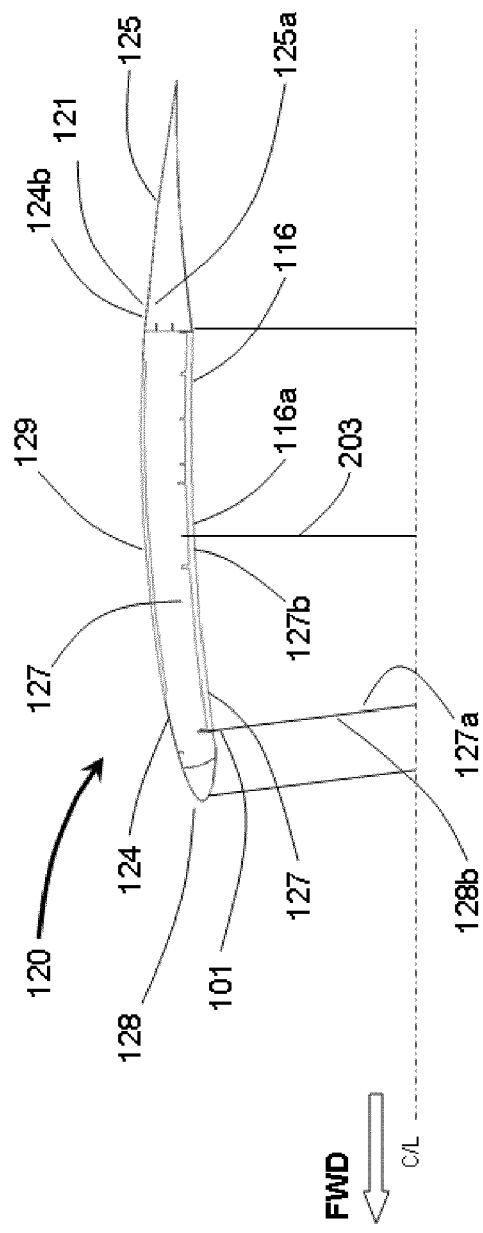
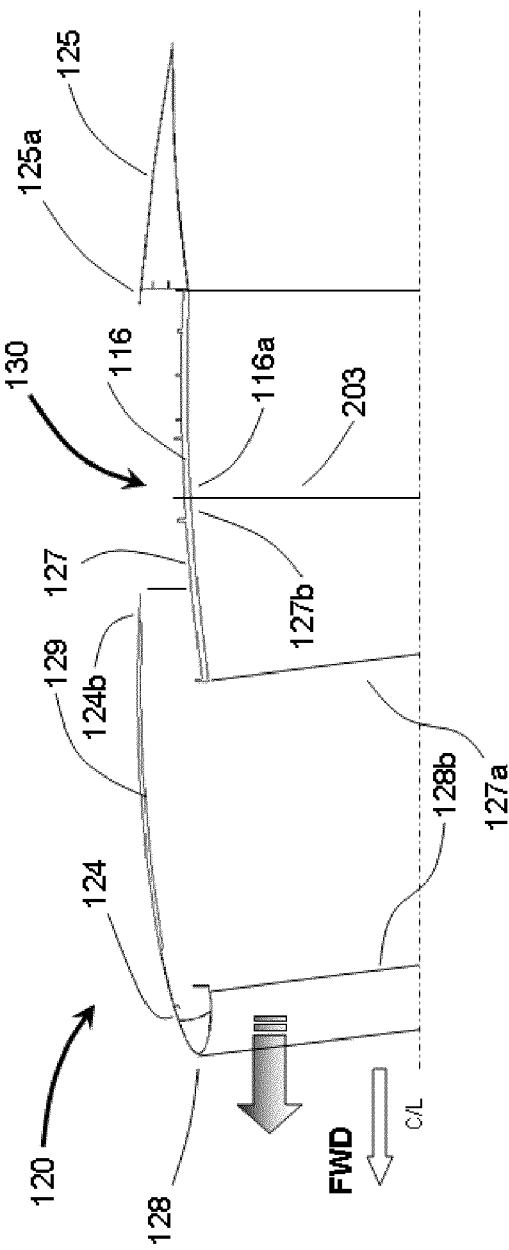

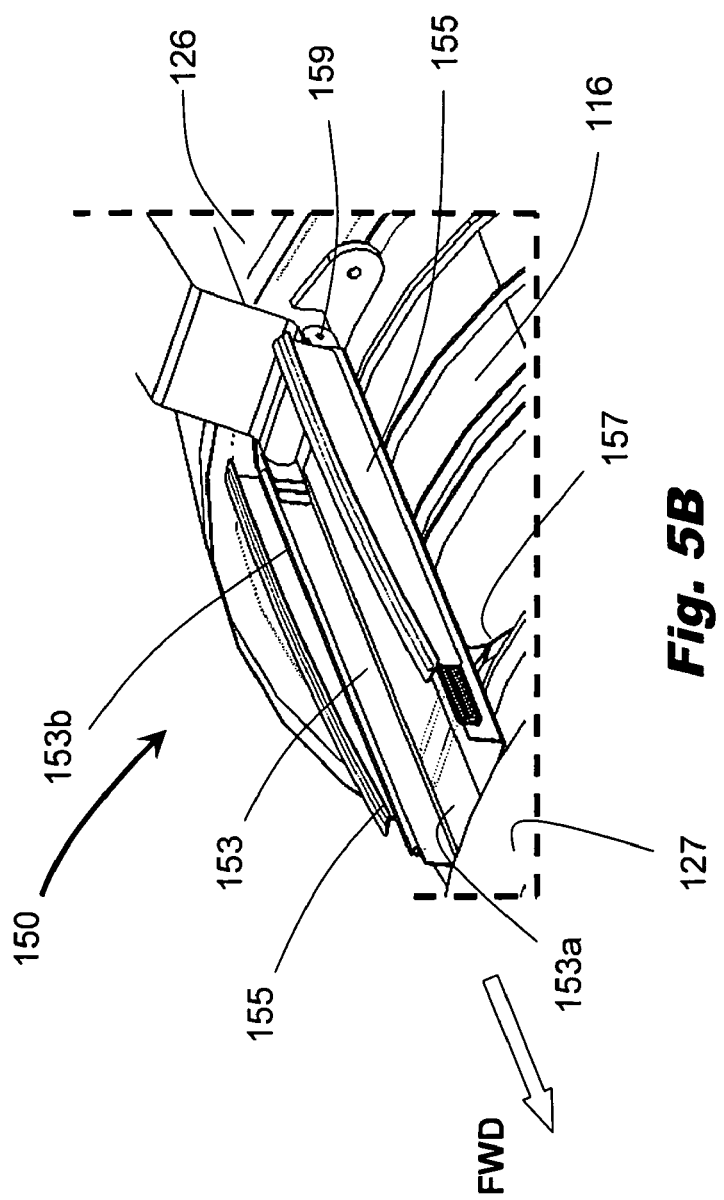

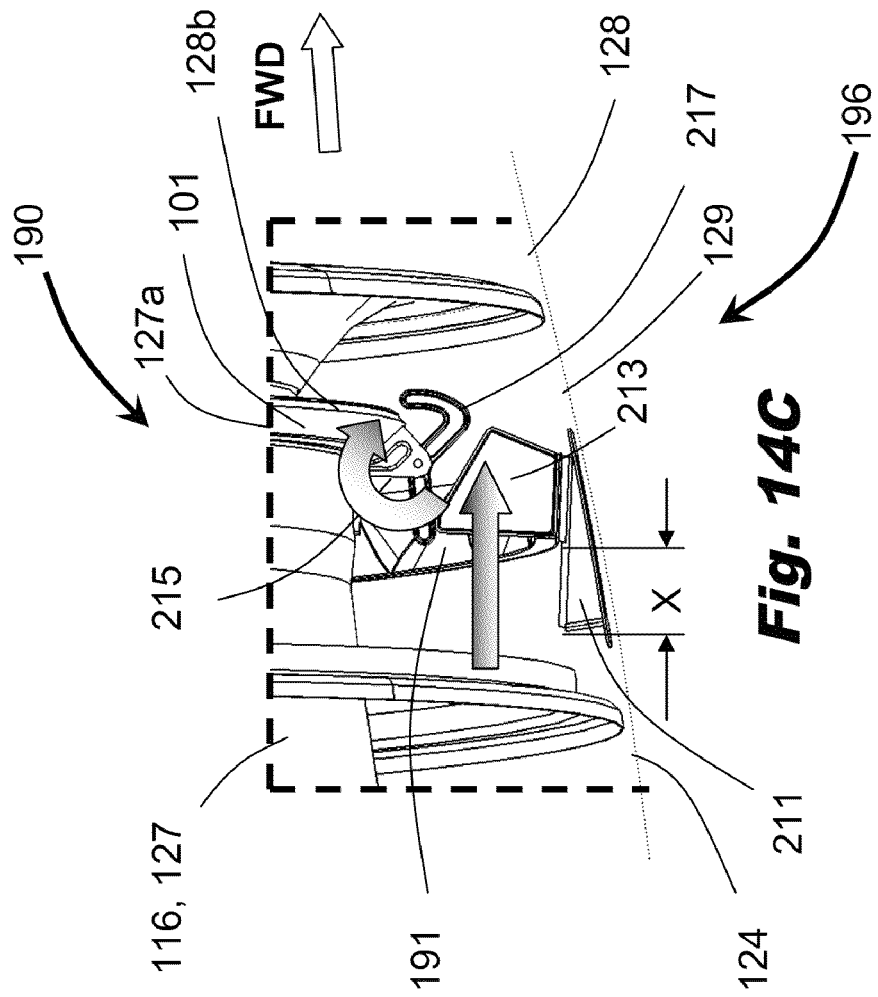

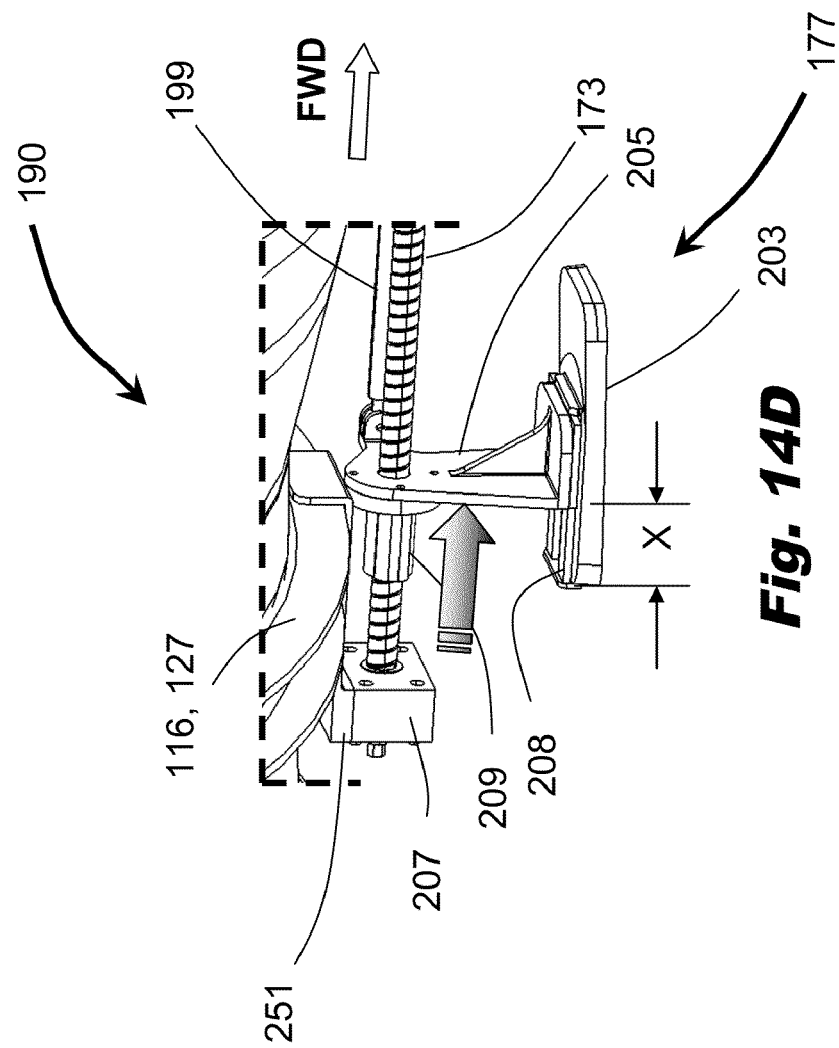

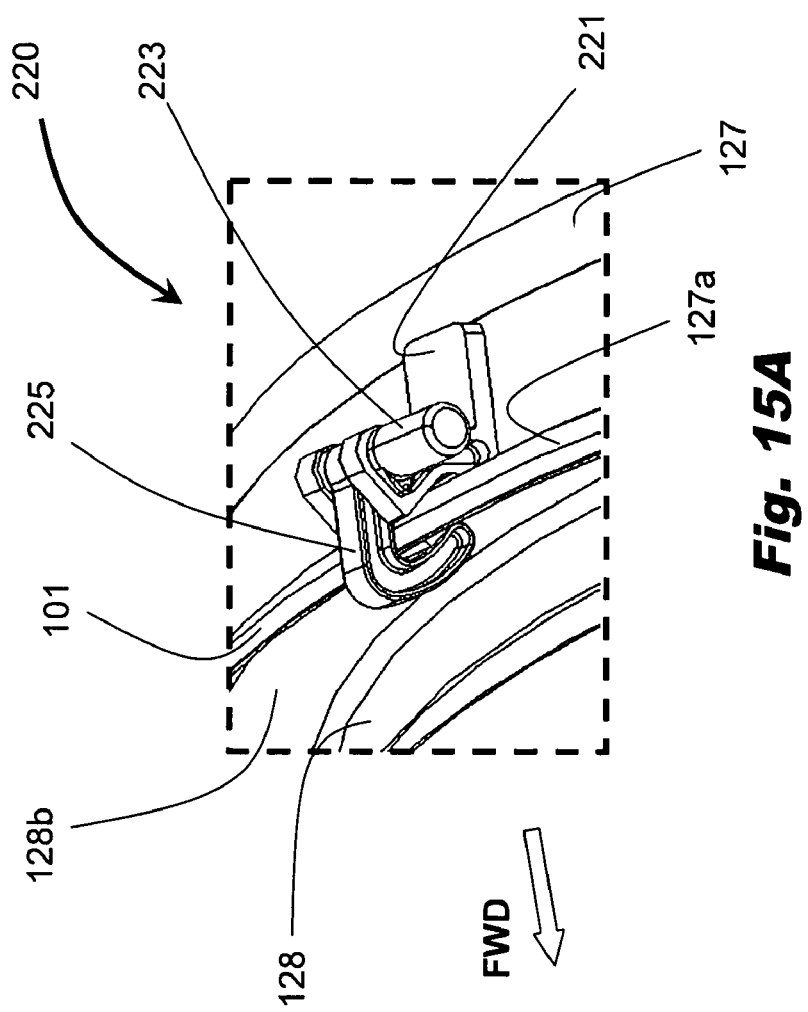

AIRCRAFT ENGINE NACELLE WITH TRANSLATING INLET COWL

FIELD OF THE INVENTION

The invention relates to nacelles for aircraft engines, and more particularly relates to a nacelle for a turbofan engine that includes a translating inlet cowl.

BACKGROUND

The functions of a nacelle for a turbofan engine for an aircraft are generally twofold. First, the nacelle directs air flow to the air intake of the engine while protecting the air flow from disturbances such as gusts, and the like. Second, the exterior surface profile of the nacelle minimizes the aerodynamic drag caused by the engine and its related components.

One design of a nacelle for a turbofan aircraft engine is described in U.S. Pat. No. 6,340,135 assigned to Rohr, Inc., and is shown in FIGS. 1A and 1B. As shown in FIGS. 1A and 1B, a turbofan engine assembly 10 includes a nacelle structure 22 and a fan case 16. In FIGS. 1A and 1B, one side of the nacelle structure 22 is removed for ease of illustration. The fan case 16 surrounds the fan blades 18 of an engine 12. As shown in FIG. 1B, the nacelle structure 22 includes a forward nacelle portion 24 and a rearward nacelle portion 25. As also shown in FIG. 1B, the forward nacelle portion 24 includes an outer skin 32, a noselip portion 28, an inner skin 30, and a plurality of bulkheads 34, 36 disposed between the outer skin 32 and the inner skin 30. The forward nacelle portion 24 is movably mounted to an aircraft's pylon structure 26 by a beam 52. The beam 52 permits the forward nacelle portion 24 to translate between a retracted operational position shown in FIG. 1A, and an extended service position shown in FIG. 1B. When the forward nacelle portion 24 is in the extended service position shown in FIG. 1B, an opening 40 between the aft edge of the forward nacelle portion 24 and the forward edge of the rearward nacelle portion 25 provides service access to various engine accessories, such as an engine's gearbox, electrical generators, and the like. When the forward nacelle portion 24 is in the operational position shown in FIG. 1A, the forward edge of the fan case 16 is releasably engaged with the aft edge of the inner barrel 30 to provide a substantially continuous inner surface.

The nacelle structure 22 described in U.S. Pat. No. 6,340,135 can be improved. In particular, there is a need for a nacelle structure having an interface between the inlet inner barrel and the fan case that is resistant to substantial damage from a blade out event, and can thus help to provide fly home capability following such an event. As is known in the art, a "blade out event" arises when a blade is accidentally released from a turbine's rotor, such as when a first-stage fan blade is accidentally released in a high-bypass gas turbine engine. U.S. Federal Aviation Administration (FAA) regulations require that certain structures be designed to sufficiently withstand such an event so that safe operation of an associated aircraft can be maintained. In addition, there is a need for a nacelle structure for a turbofan aircraft engine that is even lower in weight, and thus contributes to further increases in aircraft efficiency.

SUMMARY

One embodiment of the invention includes a nacelle for a turbofan aircraft engine having a fan case with a fan case forward edge. The nacelle can include an inlet inner barrel having an inner barrel forward edge and an inner barrel aft edge. The inner barrel aft edge can be configured to be affixed to the fan case forward edge in a stationary position on the engine. The nacelle also includes a translating inlet cowl having an inlet lip with an aft inlet lip edge and an outer skin with rear edge. The translating inlet cowl is configured to be movably attached to one or more stationary portions of the engine such that the inlet cowl is selectively movable between a stowed flight position and an extended service position.

In another embodiment, the invention includes a nacelle for an aircraft turbofan engine having a fan case with a fan case forward edge. The nacelle includes a translating inlet cowl having an inlet lip with an inlet lip aft inner edge and an outer skin with a rear edge, and a stationary aft nacelle portion including a front outer edge. The nacelle further includes an inlet inner barrel having an inlet inner barrel forward edge and an inlet inner barrel aft edge. The inlet inner barrel aft edge can be configured to be affixed to the fan case forward edge in a stationary position. The translating inlet cowl is movable between a stowed flight position and an extended service position, wherein the inlet lip aft inner edge is adjacent to the inlet inner barrel forward edge when the translating inlet cowl portion is in the stowed flight position, and wherein a service opening is formed between the rear edge of the outer skin and the front edge of the aft nacelle portion when the translating inlet cowl is in the extended service position.

In another embodiment, a nacelle for a turbofan aircraft engine having a fan case includes a translating inlet cowl and a support beam affixed to the engine fan case. The support beam substantially supports the translating inlet cowl on the engine, and is configured to permit the translating inlet cowl to be selectively translated between a stowed flight position and an extended service position.

These and other aspects of the invention will be understood from a reading of the following detailed description together with the drawings.

BRIEF DESCRIPTION OF THE DRAWINGS

FIG. 2A is a side elevation view of a turbofan aircraft engine that includes one embodiment of a nacelle structure according to the invention with the translating forward portion of the nacelle in a retracted operational position.

FIG. 3A is a partial longitudinal cross-sectional view of the turbofan aircraft engine shown in FIGS. 2A and 2B with the translating forward portion of the nacelle in a retracted operational position.

FIG. 3B is a partial longitudinal cross-sectional view of the turbofan aircraft engine shown in FIGS. 2A and 2B with the translating forward portion of the nacelle in an extended service position.

FIG. 5B is a perspective view of the support tray shown in FIG. 5A.

FIGS. 14A-14D illustrate a sequence of operation of the latching system shown in FIGS. 13A and 13B.

FIGS. 15A-15C illustrate a sequence of operation of one embodiment of an electromechanical latching system for selectively latching a nacelle inlet lip to an inner barrel.

DETAILED DESCRIPTION

Figure 1A:
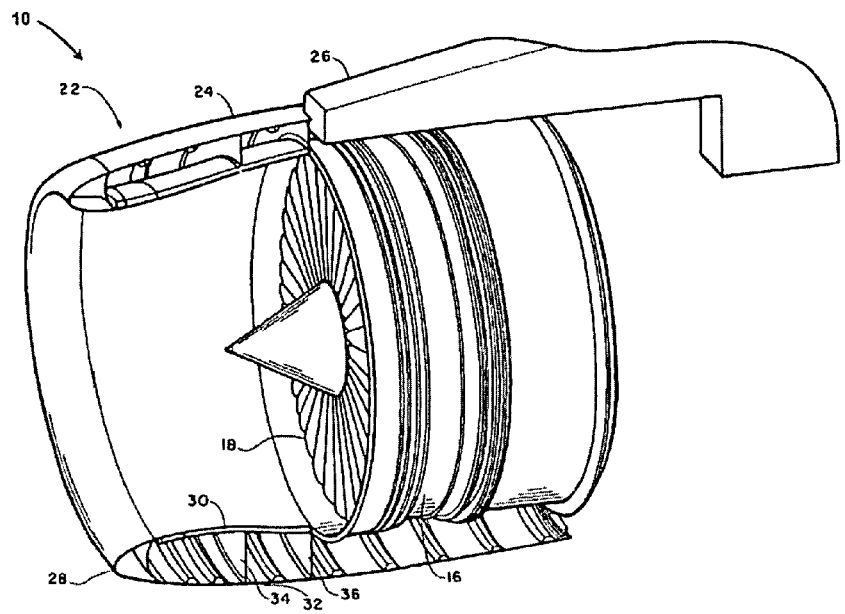
FIG. 1A is a perspective view of a prior art aircraft engine nacelle with a translating inlet cowl in its retracted operational position.
Figure 1B:
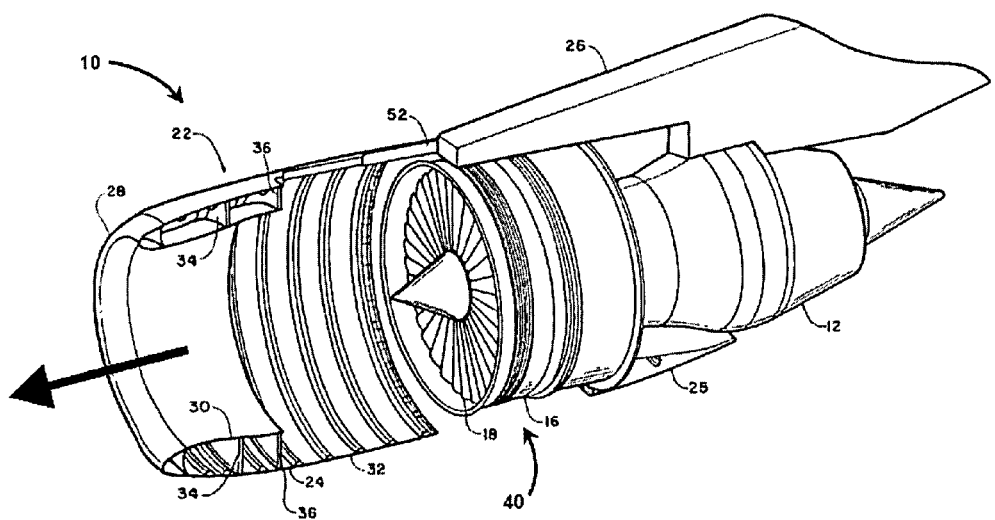
FIG. 1B is a perspective view of the prior art aircraft engine nacelle shown in FIG. 1B with the translating inlet cowl in its extended service position.
Figure 2B:
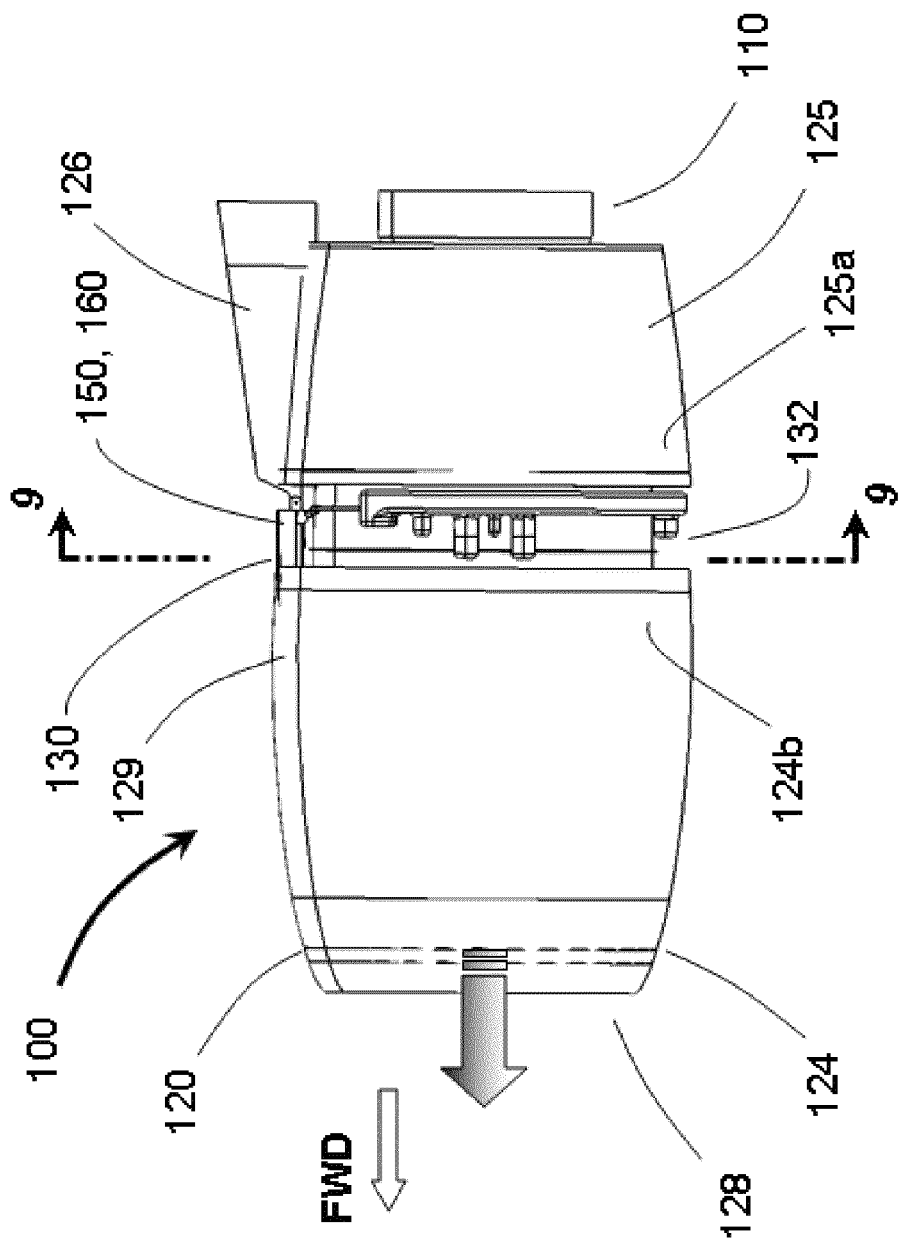
FIG. 2B is a side elevation view of the turbofan aircraft engine shown in FIG. 2A with the translating forward portion of the nacelle in an extended service position.

A turbofan aircraft engine assembly 100 equipped with one embodiment of a nacelle 120 according to the invention is shown in FIGS. 2A and 2B. The nacelle 120 shrouds an engine 110, and includes a translating inlet cowl 124 and an aft nacelle portion 125. In a flight configuration shown in FIG. 2A, the aft outer edge 124b of the translating inlet cowl 124 adjoins a forward outer edge 125a of the aft nacelle portion 125 along an aft outer joint 121. The translating inlet 124 can be removably connected to the aft cowl 125 by a plurality of circumferentially spaced latches 103. The latches 103 can be manually operated latches of a type known in the art. The latches 103 can provide an alternate load path between the translating inlet cowl 124 and the aft nacelle portion 125 that can contribute to the fly home integrity of an associated aircraft in the case of a blade out event. The latches 103 also can pretension a forward joint 101 between an inner barrel 127 and a noselip 128 (shown in FIGS. 3A and 4).

In a service access configuration shown in FIG. 2B, the translating inlet cowl 124 is translated forward such that an access opening 130 is formed between the aft outer edge 124b of the translating inlet cowl 124 and the forward outer edge 125a of the aft nacelle portion 125. The access opening 130 facilitates access to fan-mounted engine accessories 132 that are located proximate to the opening 130, such as the engine's gearbox, variable frequency starter generator (VFSG), terminal block interface, oil tank, and the like.

The relative movement between the stationary aft nacelle portion 125 and the translating inlet cowl 124 is further illustrated in the cross-sectional views of FIGS. 3A and 3B. In the flight configuration shown in FIG. 3A, the aft outer edge 124b of the translating inlet cowl 124 can overlap the forward outer edge 125a of the aft nacelle portion 125 along the aft outer joint 121. As also shown in FIG. 3A, the translating inlet cowl 124 can include an inlet lip 128 and an outer skin 129. An inner barrel section 127 can be affixed to a fan case 116. In the configuration shown in FIG. 3A, the aft edge 127b of the inner barrel 127 and the forward edge 116a of the fan case liner 116 are joined along an interior joint 203. The adjoining edges 127b, 116a of the inner barrel 127 and the fan case liner 116 can be connected together using mechanical fasteners such as bolts or rivets, or the like. Alternatively, the connected inner barrel section 127 and the interior joint 203 can be eliminated, and the fan case 116 can be extended to the forward joint 101.

In the closed flight configuration shown in FIG. 3A, an inner aft edge 128b of the noselip 128 adjoins the forward edge 127a of the inner barrel section 127 along a forward interior joint 101. In the service access configuration shown in FIG. 3B, the forward nacelle portion 124 is translated forward relative to the aft nacelle portion 125, thus forming the service access opening 130 therebetween. As can be seen in FIG. 3B, the opening 130 provides substantially unobstructed exterior access to the outer surface of the fan case 116 and to any accessory equipment mounted or situated therearound.

Figure 4:
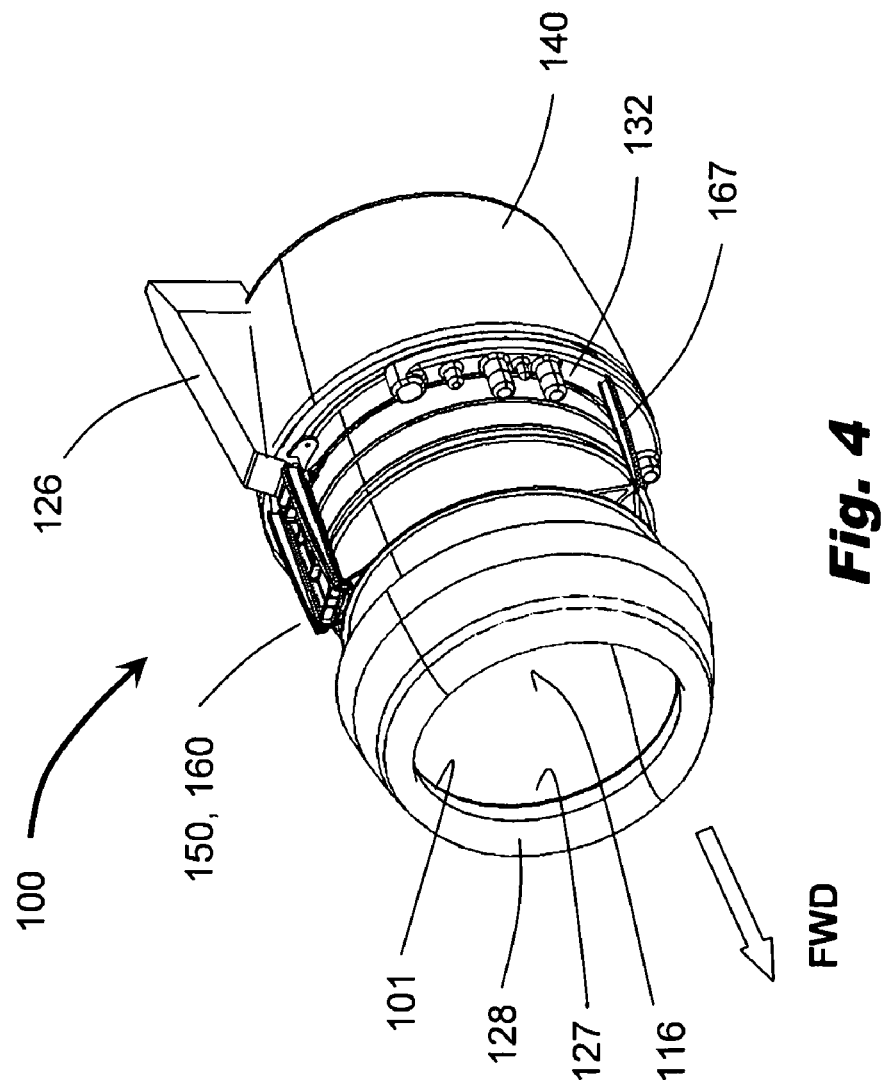
FIG. 4 is a front perspective view of the turbofan aircraft engine shown in FIGS. 2A-3B.

Various configurations for supporting the translating inlet cowl 124 on an aircraft engine assembly 100 are shown in FIGS. 4-12. As shown in FIG. 4, the translating inlet cowl 124 can be movably supported by a support beam assembly 150, 160 and by one or more side stabilizing beams 167. In this embodiment, a substantial portion of the weight of the translating inlet cowl 124 can be borne by the support beam assembly 150, 160, and the side stabilizing beams 167 primarily assist in maintaining alignment and stability of the translating inlet cowl 124 when the cowl 124 is translated forward. In one embodiment, the translating inlet cowl 124 is supported by two side stabilizing beams 167, each positioned proximate to a lateral side of the engine assembly 100. Support beam assemblies 150 and 160 are alternate embodiments for movably supporting the translating inlet cowl 124, and are described below.

Figure 5A:
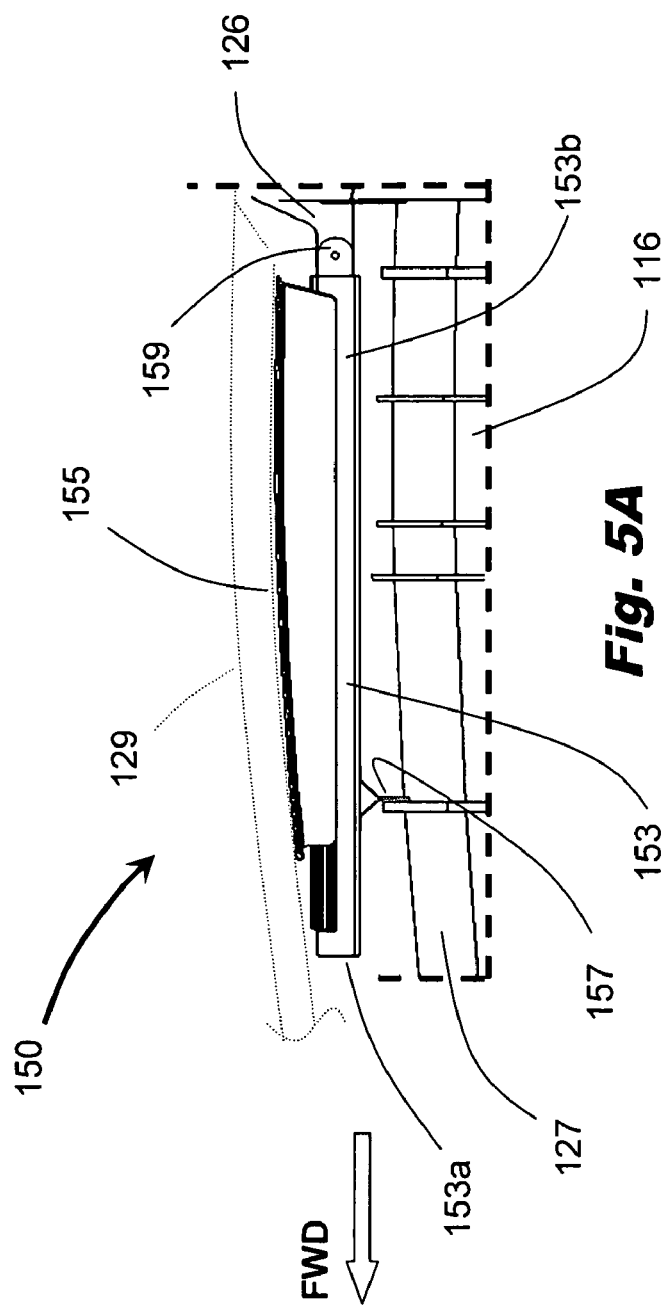
FIG. 5A is a side elevation view of a support tray for movably mounting the translating forward portion of the nacelle to fixed portions of a turbofan engine assembly.

One embodiment of a support beam assembly 150 is shown in FIGS. 5A and 5B. In this embodiment, the support beam assembly 150 includes an elongated beam 153 and a pair of opposed sliding members 155. As shown in FIG. 5A, the sliding members 155 can be securely attached to the translating inlet cowl's outer skin 129. The sliding members 155 are slidably engaged on the beam 153. In FIGS. 5A and 5B, the sliding members 155 are shown in their fully retracted positions on the beam 153. In this embodiment, the aft end 153b of the beam 153 is attached to a forward portion of an engine pylon 126 by a pair of clevis-type connectors 159, and the forward end 153a of the beam 153 is connected to the fan case liner 116 by one or more brackets 157.

Figure 6A:
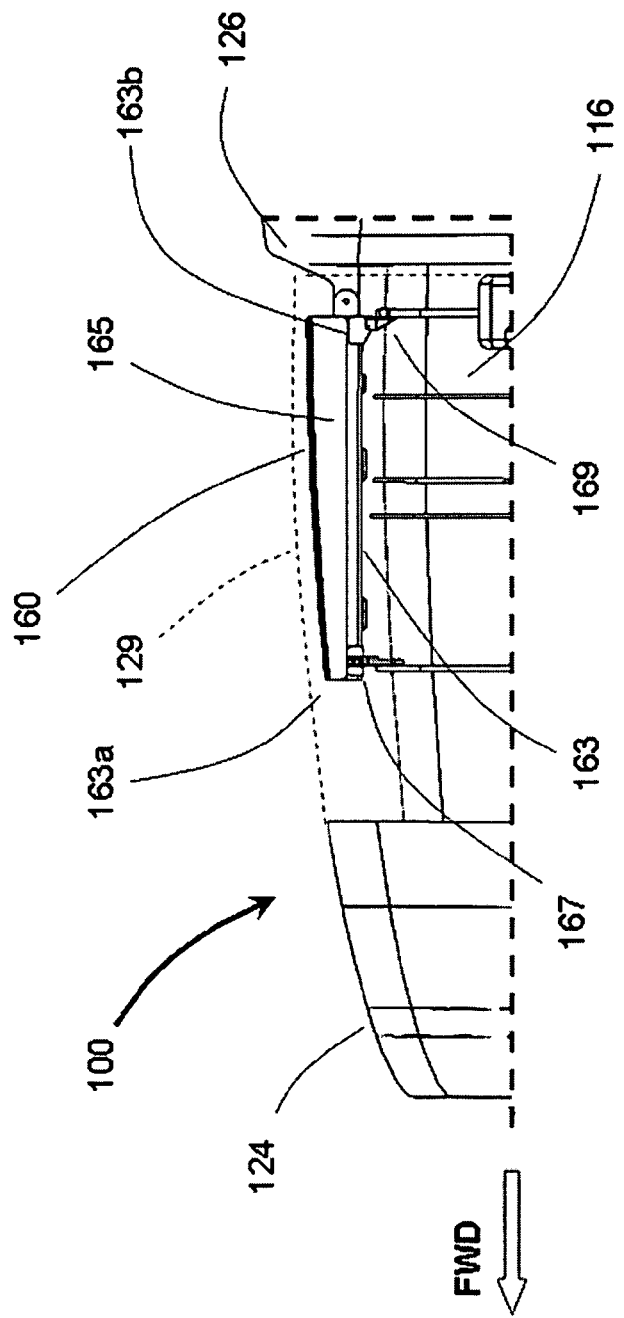
FIG. 6A is a side elevation view of another embodiment of a support tray for movably mounting the translating forward portion of the nacelle to fixed portions of a turbofan engine assembly.
Figure 6B:
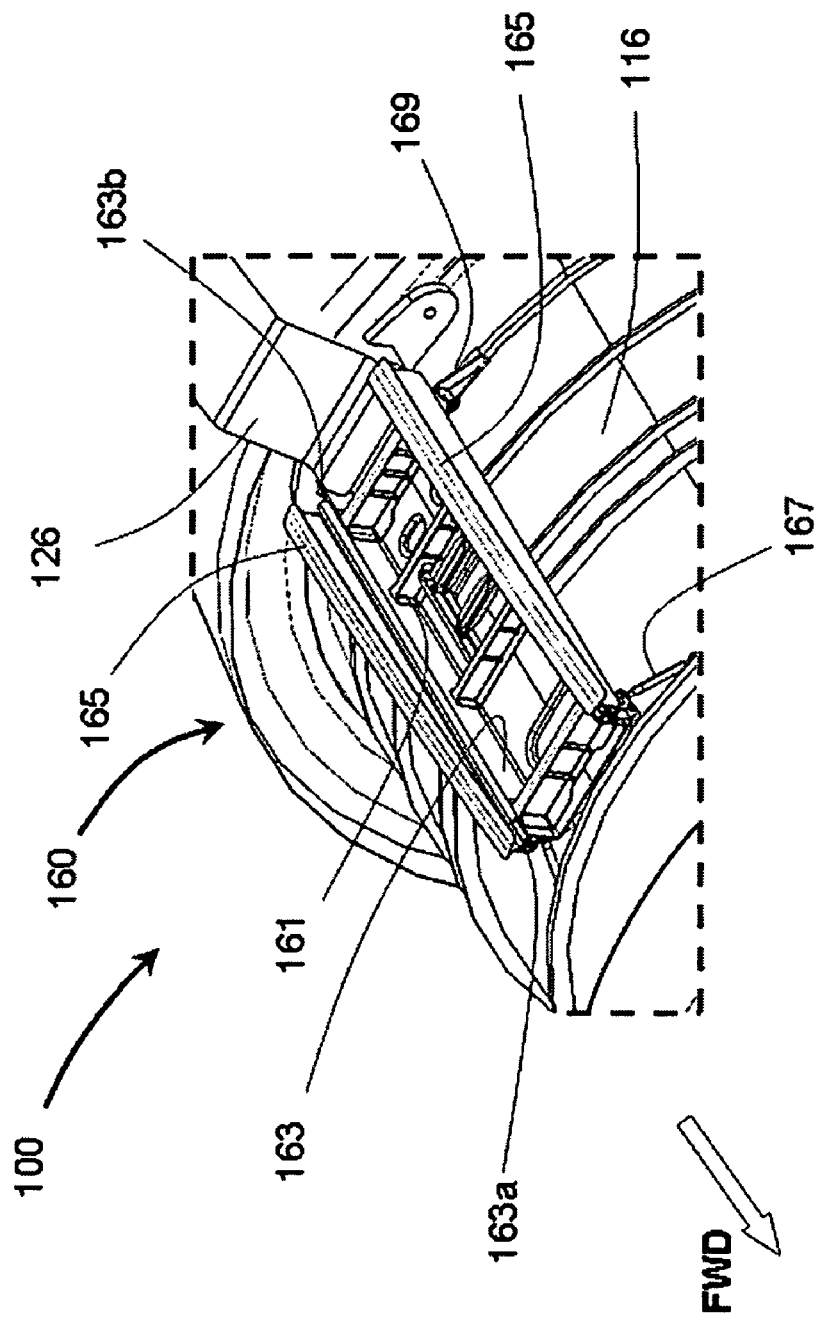
FIG. 6B is a perspective view of the support tray shown in FIG. 6A.

In an alternative embodiment shown in FIGS. 6A and 6B, a support beam assembly 160 includes an elongated beam 163 and a pair of opposed sliding members 165. Again, the sliding members 165 can be securely attached to the translating inlet cowl's outer skin 129, and are slidably engaged on the beam 163. In FIGS. 6A and 6B, the sliding members 165 are shown in their fully retracted positions on the beam 163. In this embodiment, the aft end 163b of the beam 163 is attached to an aft portion of the fan case liner 116 by one or more trunnions or brackets 169, and the forward end 163a of the beam 163 is connected to a forward end of the fan case liner 116 by one or more brackets or tie rods 167, or the like. As shown in FIG. 6B, the beam 163 can include one or more stiffeners 161 to provide a more rigid beam structure. Though not shown in FIGS. 5A and 5B, the beam 153 of support beam assembly 150 can also include one or more similar stiffeners.

Figure 7:
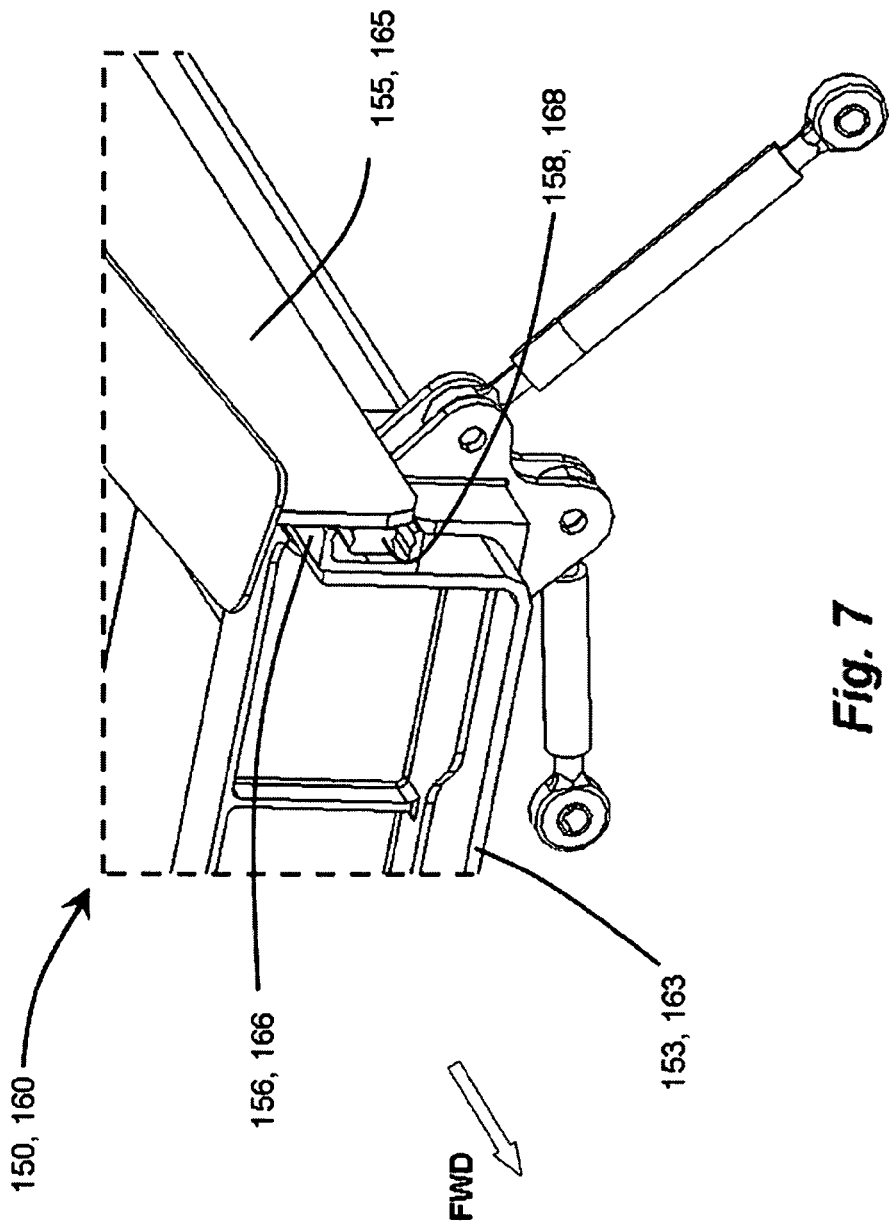
FIG. 7 is a perspective view showing details of the support tray shown in FIGS. 5A-6B.
Figure 8:
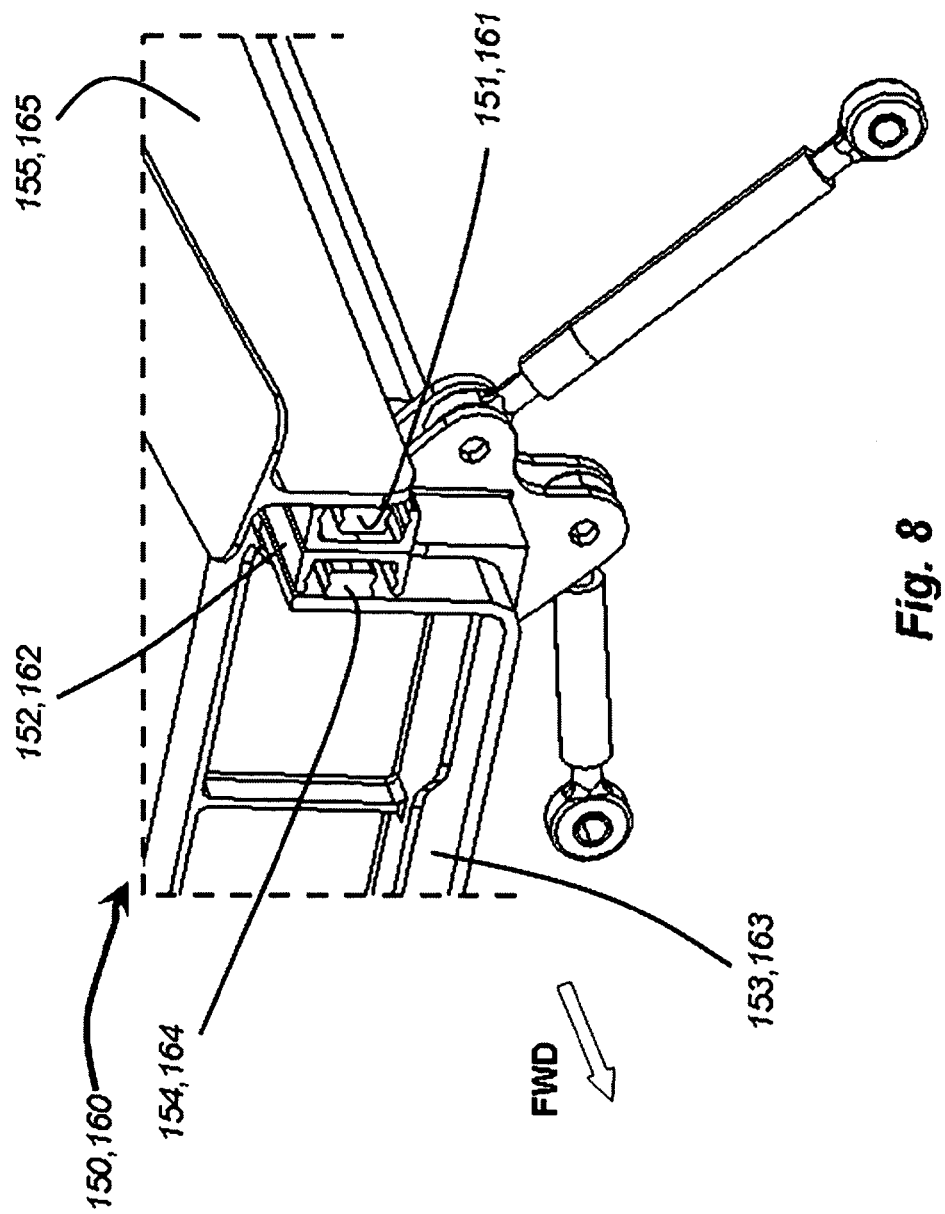
FIG. 8 is a perspective view showing alternative details of the support tray shown in FIGS. 5A-6B.

Further details of the support beam assemblies 150, 160 are shown in FIGS. 7 and 8. In FIG. 7, the sliding members 155, 165 each include a slide 158, 168 that is engaged with a single rail 156, 166 on the beam 153, 163. A plurality of ball bearings can be disposed between the slides 158, 168 and the single rails 156, 166 to minimize friction and facilitate relative sliding movement between the sliding members 155, 165 and the beams 153, 163 (not shown in FIGS. 7 and 8). In the single-rail configuration shown in FIG. 7, forward translation of the slide 158, 168 in the single rail 156, 166 permits the sliding members 155, 165 to translate forward of the beam 153, 163. In this arrangement, the maximum distance that the sliding members 155, 165 can translate forward of the beam 153, 163 is limited by the length of the single rail 156, 166.

In the double-rail configuration shown in FIG. 8, the sliding members 155, 165 each include a first slide 151, 161 that is engaged with a first side of a double rail 152, 162 on the beam 153, 163, and a second slide 154, 164 on the beam 153, 163 is engaged with a second side of the double rail 152, 162. In this arrangement, the double rail 152, 162 can translate forward of the beam 153, 163 on the second slide 154, 164, and the sliding members 155, 165 and first slides 151, 161 can translate forward of the extended double rail 152, 162. Thus, the maximum distance that the sliding members 155, 165 can translate forward of the beam 153, 163 is almost twice the length of the double rail 152, 162. Accordingly, when the single rails 156, 166 (FIG. 7) and the double rails 152, 162 (FIG. 8) have equal lengths, the double-rail configuration shown in FIG. 8 permits approximately twice the translational displacement between the sliding members 155, 165 and the beam 153, 163 as the single-rail arrangement shown in FIG. 7. Again, a plurality of ball bearings can be disposed between the slides 154, 164 and the rails 152, 162 to minimize friction and facilitate relative sliding movement between the sliding members 155, 165 and the beams 153, 163 (not shown in FIGS. 7 and 8). In this embodiment, once the latches 103 have been released, the translating cowl can be manually pushed forward to provide access to the fan case mounted accessories.

Figure 9:
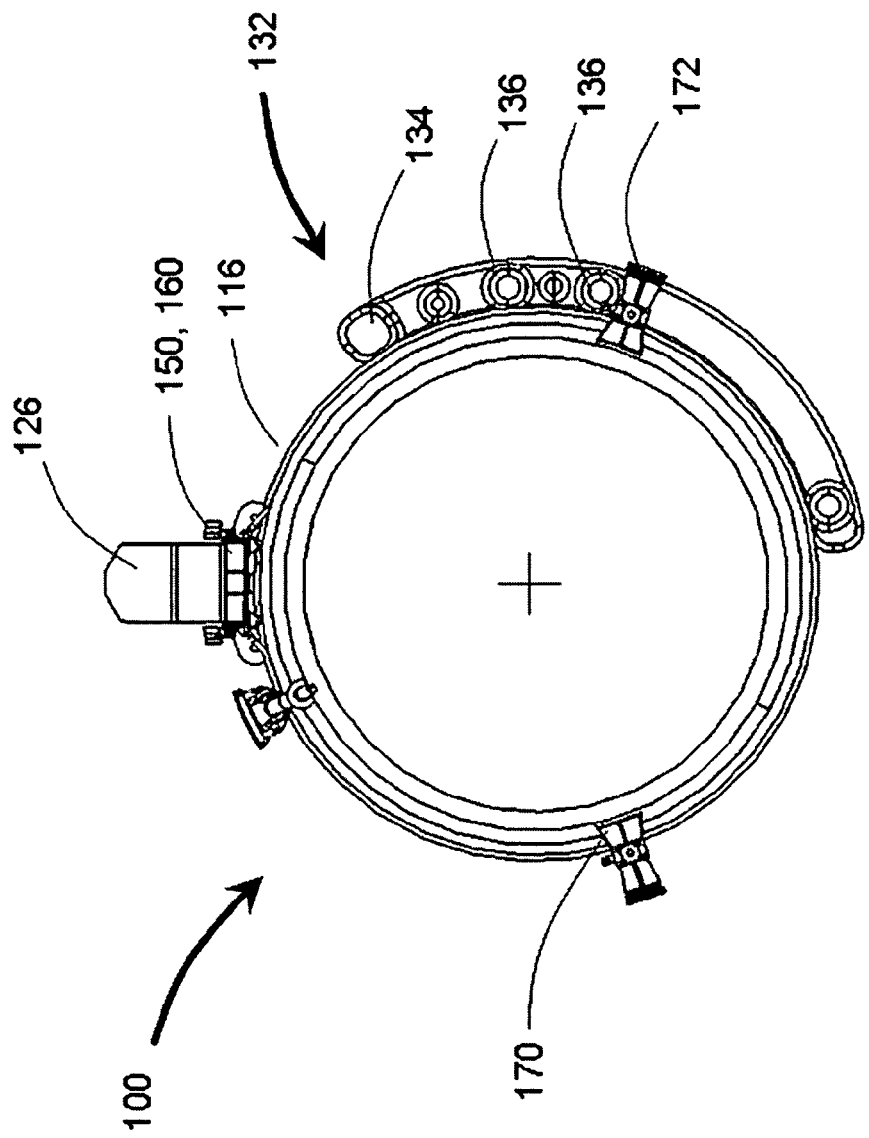
FIG. 9 is a front cross-sectional view of portions of a nacelle assembly according to the invention taken along section line 9-9 in FIG. 2B.
Figure 10:
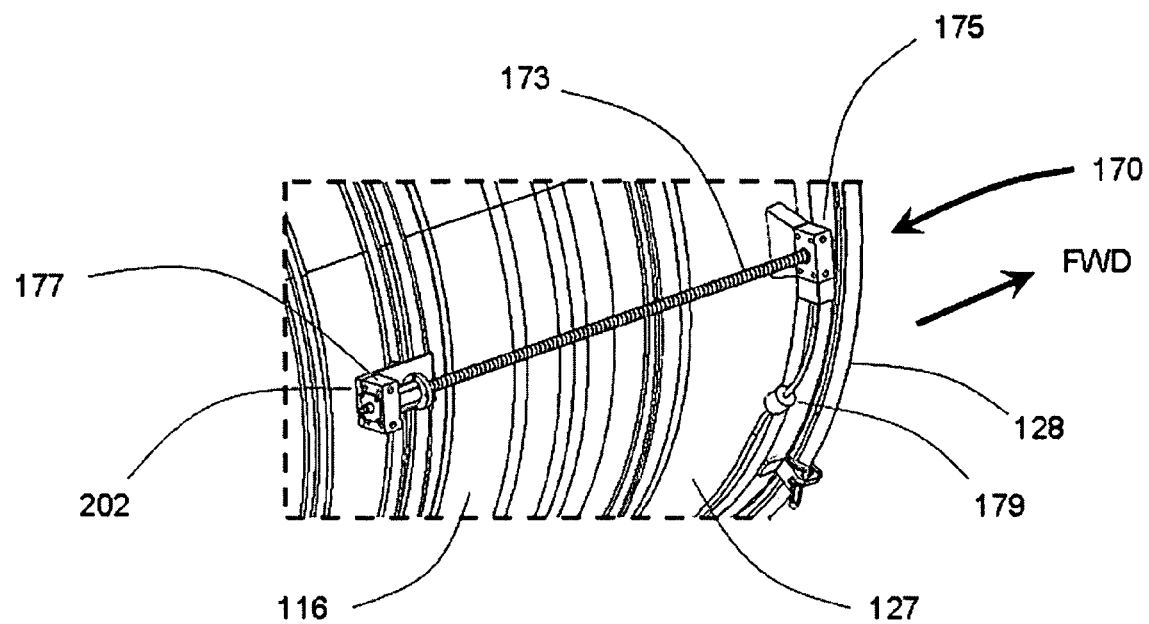
FIG. 10 is a perspective view of an actuator for moving a forward nacelle portion between a retracted operational position and an extended service position.
Figure 11:
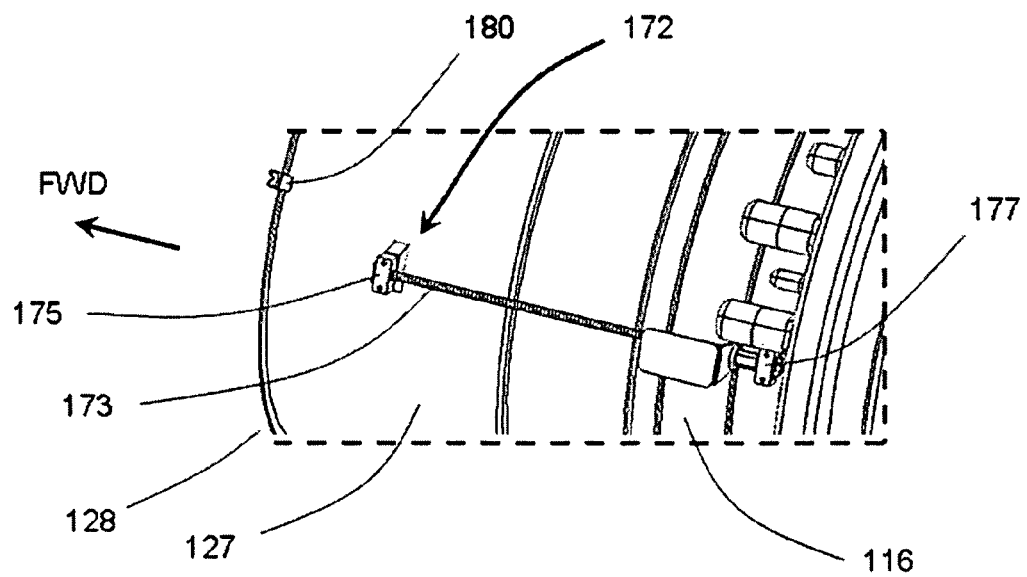
FIG. 11 is a perspective view of another actuator for moving a forward nacelle portion between a retracted operational position and an extended service position.

One embodiment of a system for translating an inlet cowl 124 between its retracted and extended positions is shown in FIGS. 9-11. As shown in FIG. 9, one or more linear actuators 170, 172 can be provided for automatically moving the inlet cowl 124 between its stowed and service positions. In the embodiment shown in FIG. 9, a linear actuator 170, 172 is provided on each lateral side of the fan case liner 116, wherein the two actuators 170, 172 are substantially equidistant from the support beam 150, 160.

Figure 13A:
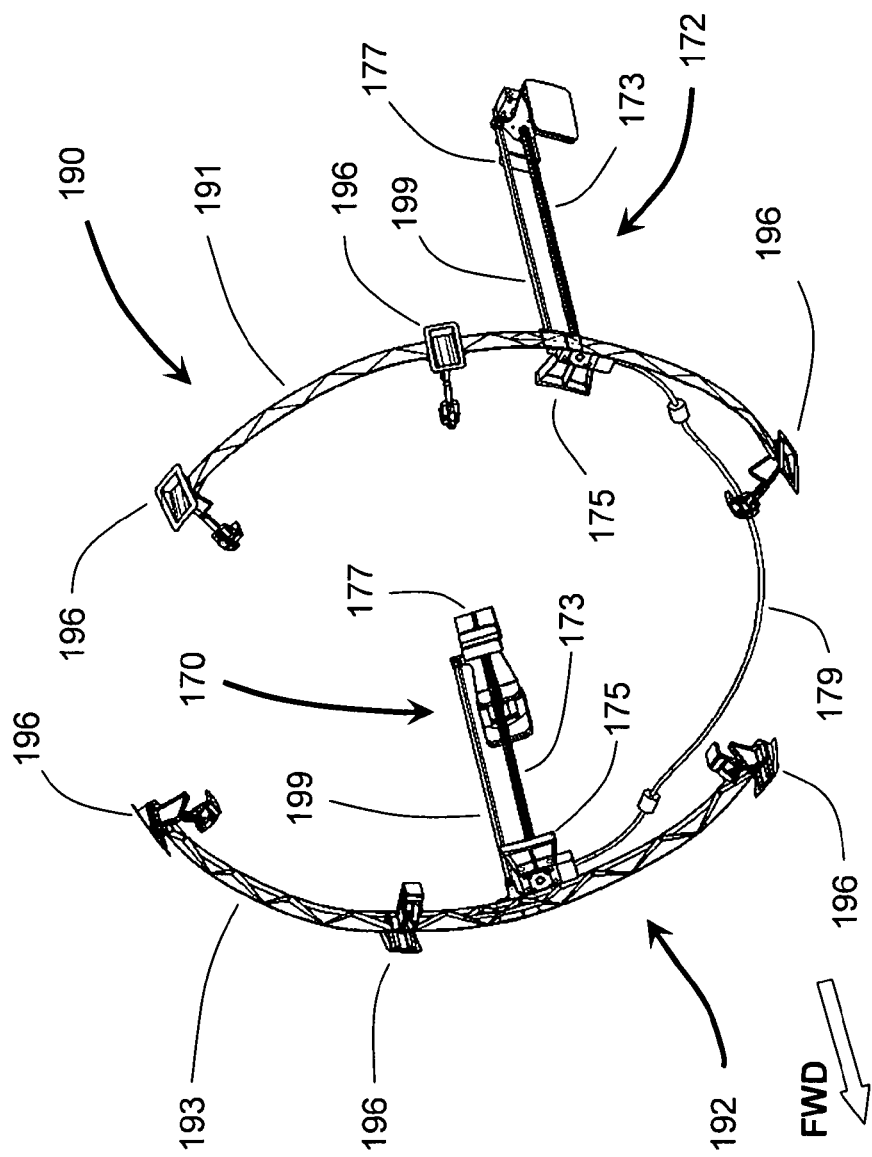
FIG. 13A is a perspective view of one embodiment of a mechanical latching system for selectively latching a nacelle inlet lip to an inner barrel.
Figure 13B:
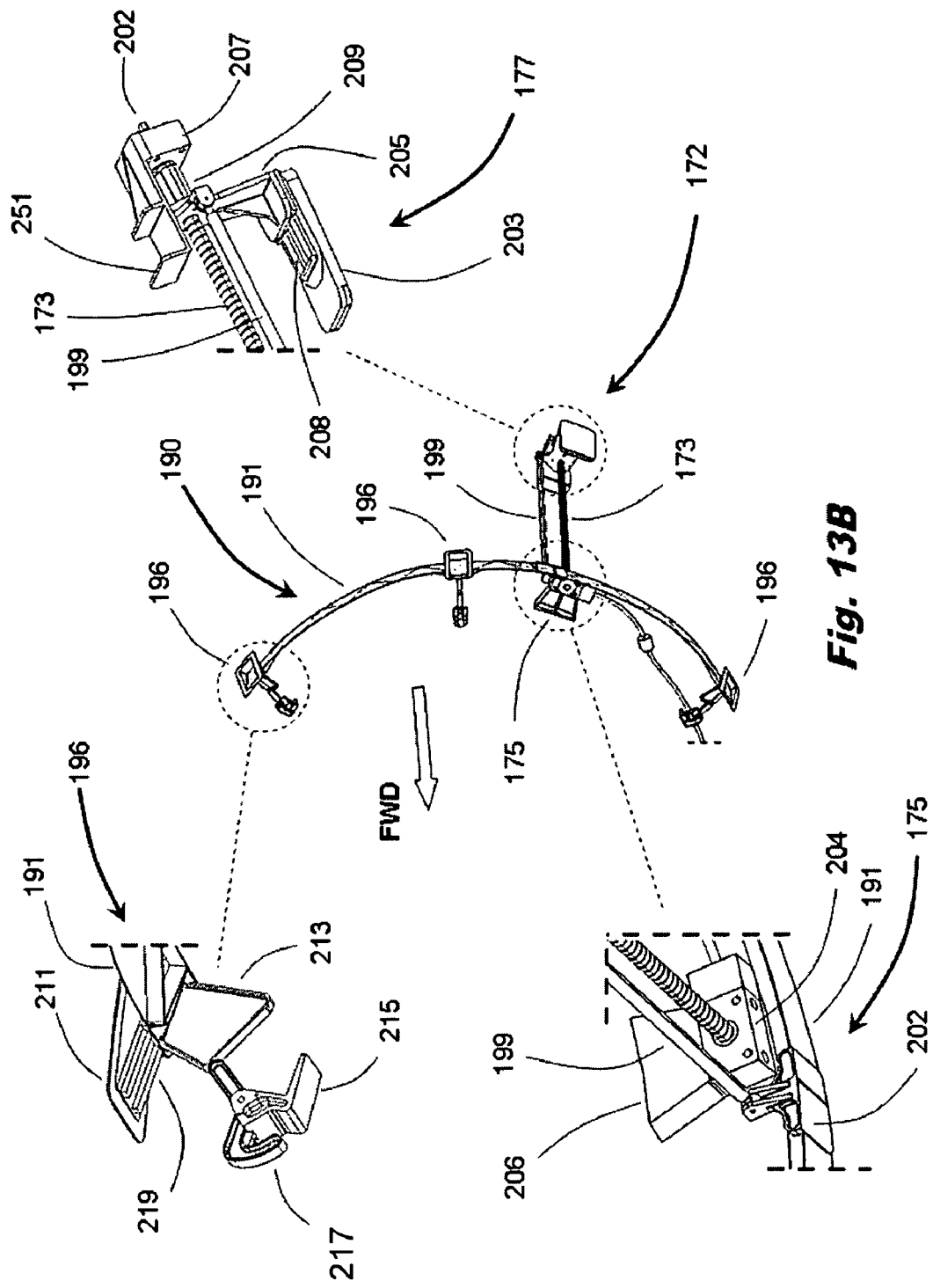
FIG. 13B is a partial perspective view of the mechanical latching system shown in FIG. 13A showing various details of the system.

As respectively shown in FIGS. 10 and 11, the linear actuators 170, 172 can be ball screw actuators. In the embodiment shown, first and second actuators 170, 172 each include a ball screw 173 having a forward end engaged with a forward ball screw support 175, and an aft end engaged with an aft ball screw support 177. As shown in FIG. 10, the aft tip 202 of the ball screw 173 of an actuator 170 can outwardly extend from its associated aft ball screw support 177. The aft ball screw support 177 and/or tip 202 can include a hex configuration for driving engagement with an air motor or other powered rotational tool or device (not shown). As shown in FIGS. 10 and 13A, the two forward ball screw supports 175 can be connected by a synchronizing cable 179 such that powered rotation of one ball screw 173 will result in simultaneous and synchronized rotation of the other ball screw 173. As shown in FIGS. 10 and 11, the forward ball screw supports 175 and the aft ball screw supports 177 can be connected to the fan case 116. Selective rotation of the screws 173 results in translational displacement of the face plates 203 and the inlet cowl 124 connected thereto. Accordingly, the inlet cowl 124 can be translated in forward and aft directions relative to the fan case 116 (as previously shown in FIGS. 3A and 3B) by selective rotation of the ball screws 173.

Figure 12:
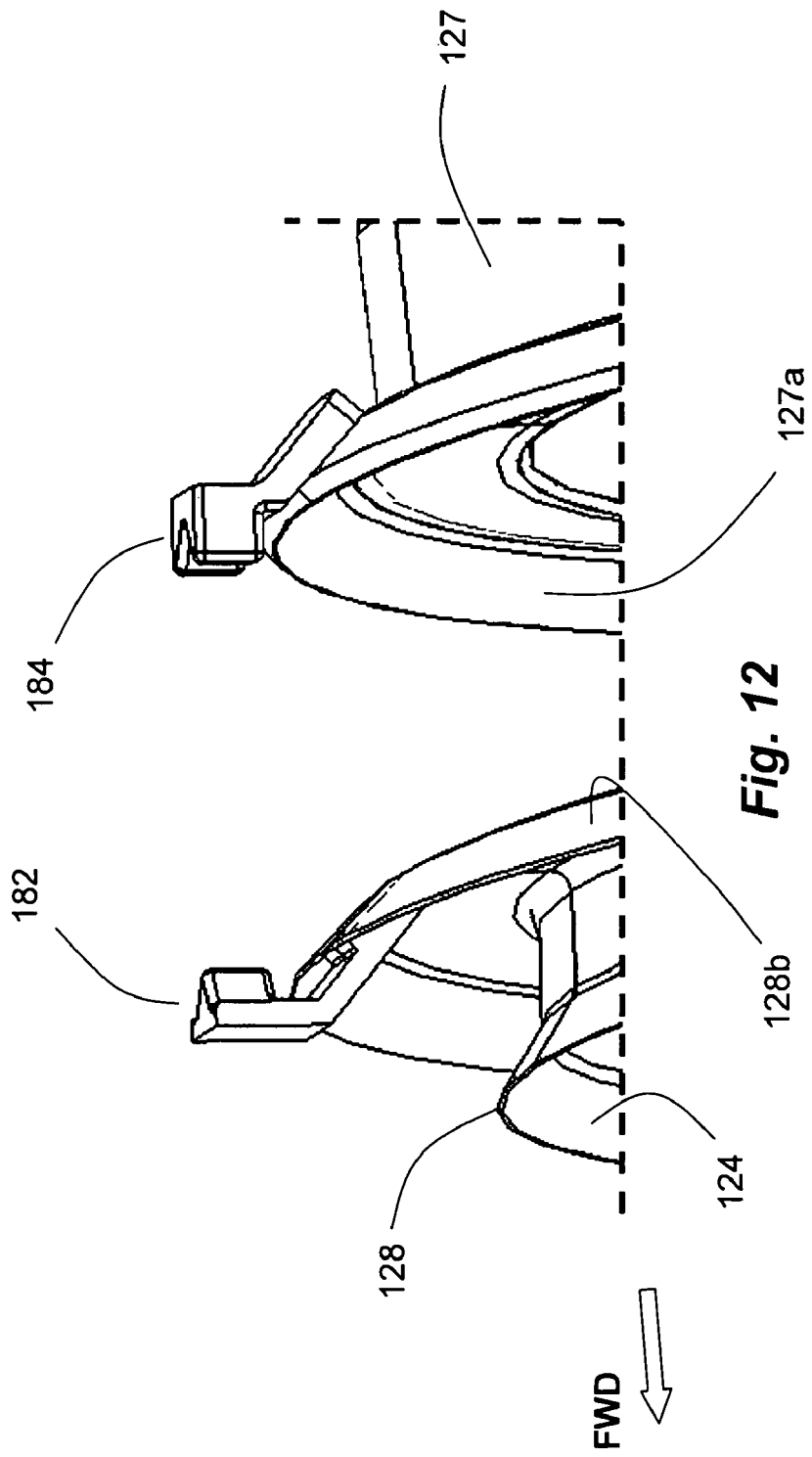
FIG. 12 is a partial perspective view of a nacelle structure according to the invention showing a pair of clocking fittings.

As shown in FIG. 12, the inlet cowl 124 and inner barrel 127 can include clocking fittings 182, 184 in order to maintain rotational alignment between the translating inlet cowl 124 and the inner barrel 127. The clocking fittings can include mating V-shaped male and female members 182, 184 that engage each other when the aft edge 128b of the inlet lip 128 is retracted against the forward edge 127a of the inner barrel 127. In the embodiment shown in FIG. 12, a male V-block 182 is affixed to an aft portion 128b of the inlet lip 128, and a mating female V-block 184 is affixed to a forward portion 127a of the inner barrel 127. One or more pairs of mating blocks 182, 184 can be circumferentially spaced around the inlet lip 128 and the inner barrel 127.

FIGS. 13A-15C show embodiments of two latching systems 190, 220 that may be used to latch the translating inlet cowl to the inner barrel in the stowed flight position. In a first embodiment shown in FIGS. 13A-14D, a mechanical latching system 190 is integrated with the ball-screw linear actuators 170, 172 described above. As shown in FIG. 13A, the latching system 190 includes a pair of ring segments 191, 193. Each ring segment 191, 193 includes a plurality of circumferentially spaced latch assemblies 196. As shown in FIG. 13B, the aft ball screw support 177 on the aft end of the left-side actuator 172 (as best shown in the enlarged altered detail in the upper right portion of FIG. 13B) can include an aft ball screw receiver 207 joined to the engine fan case 116 via the aft ball screw support bracket 251. The face plate 203 can be affixed to the outer skin 129 (not shown in FIG. 13B). The aft push rod fitting 205 is slidably engaged with the face plate slide 208 on the face plate 203. As also shown in FIG. 13B, the forward ball screw support 175 on the forward end of the left-side actuator 172 (as best shown in the enlarged altered detail in the lower left portion of FIG. 13B) includes a forward ball screw receiver 204 and a forward support block 206. The forward support block 206 can be affixed to a portion of the fan case 116. As further shown in FIG. 13B, each latch assembly 196 (as best shown in the enlarged altered detail in the upper left portion of FIG. 13B) includes a slide base 211 with a latch ring slide 219, and a strike 213 slidably engaged in the latch ring slide 219. The slide base 211 can be affixed to the outer skin 129 of the translatable inlet cowl 124 (see FIG. 14C). A hook-shaped latch catch 217 is pivotally mounted to a pivot fitting 215, which can be affixed to a forward portion of the inlet inner barrel 127 (see FIG. 14B). The latch catches 217 can be biased by springs toward a latched position, wherein the latch catches 217 grab the aft edge 128b of the inlet lip 128, and clamp the inlet lip 128 to the forward edge 127a of the inner barrel 127 (see FIG. 14C). As shown in FIG. 13B, a push rod 199 extends between the aft push rod fitting 205 and a forward push rod fitting 202 affixed to the latch ring segment 191. The right side portion 192 of the mechanical latching system shown in FIG. 13A can be a mirror image of the left side portion shown in detail in FIG. 13B.

Figure 14A:
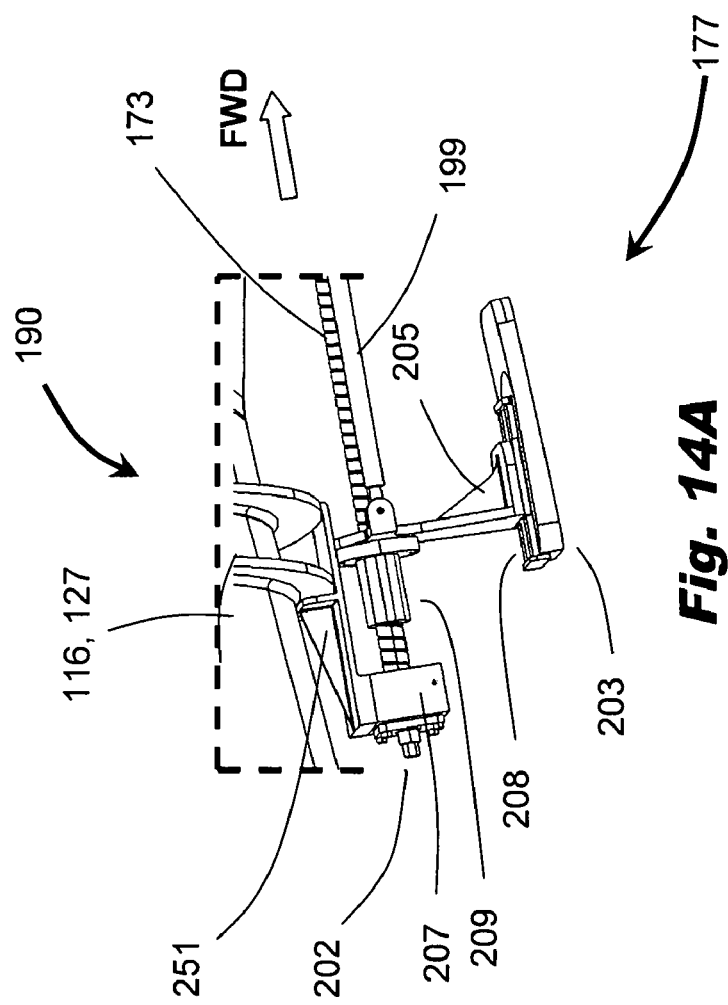
Figure 14B:
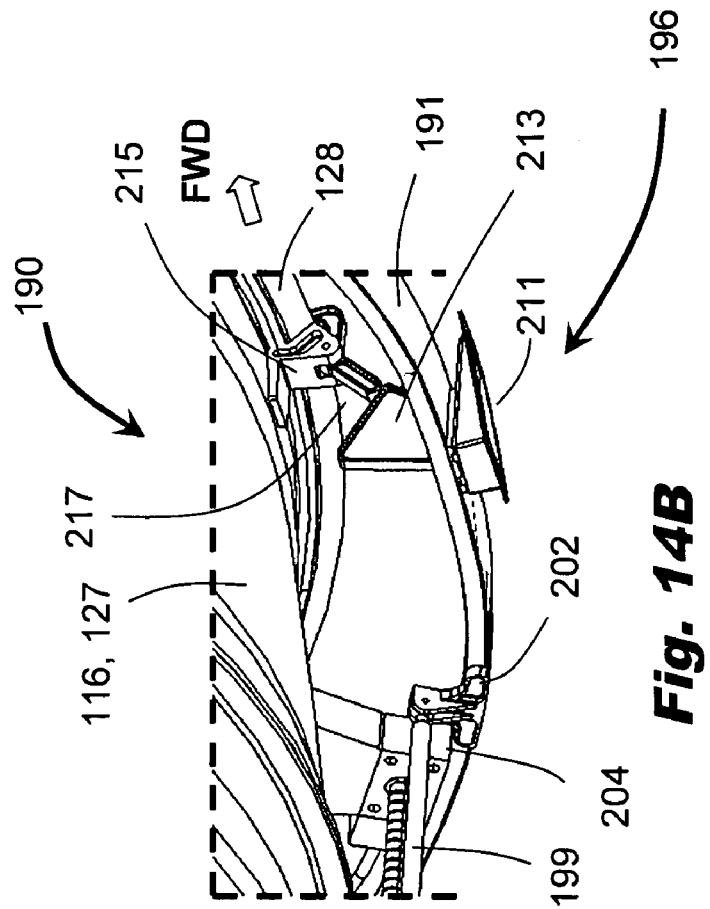

Operation of the mechanical latch system 190 is described with reference to FIGS. 14A-14D. In the following description, the translatable inlet cowl is initially in its stowed flight position, and the spring loaded latch catches 217 described above are initially engaged with the inlet lip. Referring to FIG. 14A, initial clockwise rotation of the end 202 of the ball screw 173 with an air motor or other rotating tool causes the ball screw nut 209, the aft push rod fitting 205, and the attached push rod 199 to move in a forward direction relative to the face plate 203, with the aft push rod fitting 205 sliding within the face plate slide 208. As shown in FIG. 14B, the initial forward movement of the push rod 199 results in corresponding forward movement of the latch ring segment 191 and the affixed strike 213. As shown in FIG. 14C, as the wedge-shaped strike 213 moves forward, contact with the corresponding latch catch 217 causes the latch catch 217 to rotate away from its fully latched engagement with the aft edge 128b of the inlet lip 128. As shown in FIG. 14D, once the aft push rod fitting 205 has moved a distance "x" and reaches the end of the face plate slide 208, the aft push rod fitting 205 is prevented from moving further in a forward direction with respect to the face plate 203. When the aft push rod fitting 205 and push rod 199 are in the forward-most positions shown in FIG. 14D, the wedge-shaped strikes 213 have also advanced a distance "x", and have moved sufficiently to cause the latch catches 217 to fully disengage from the aft edge 128b of the inlet lip 128 as shown in FIG. 14C, thus freeing the inlet cowl 124 to translate forward. Further rotation of the ball screw 173 causes the face plate 203 and the affixed inlet cowl 124 to translate forward relative to the aft nacelle portion 125, thus forming the service access opening 130 shown in FIGS. 2B and 3B.

To return the inlet cowl 124 to its stowed flight position, the process described above and shown in FIGS. 14A-14D is reversed. Counterclockwise rotation of the ball screw 173 produces aftward movement of the inlet cowl 124 until the aft edge 128b of the inlet lip 128 contacts the forward edge 127a of the inner barrel 127. Additional counterclockwise rotation of the ball screw 173 causes the aft push rod fitting 205 to slide back on the face plate 203, thus pulling the push rod 199 and the connected the latch ring segment 191 and strikes 213 aftward. Once the strikes 213 have reached their rearmost positions and have disengaged from the latch catches 217, the spring-loaded latch catches 217 are free to engage portions of the inlet lip 128, and thereby latch the inlet cowl 124 to the fan case 116 and inner barrel 127.

Figure 15B:
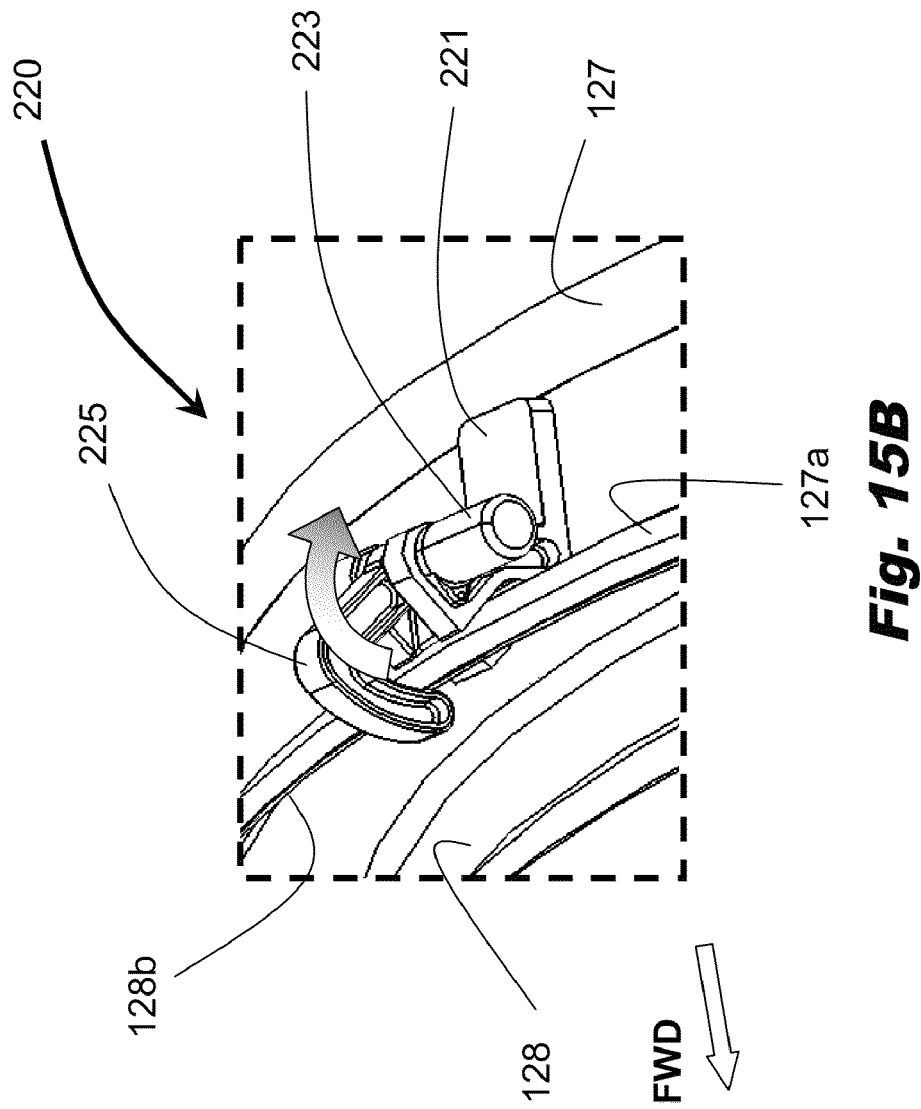
Figure 15C:
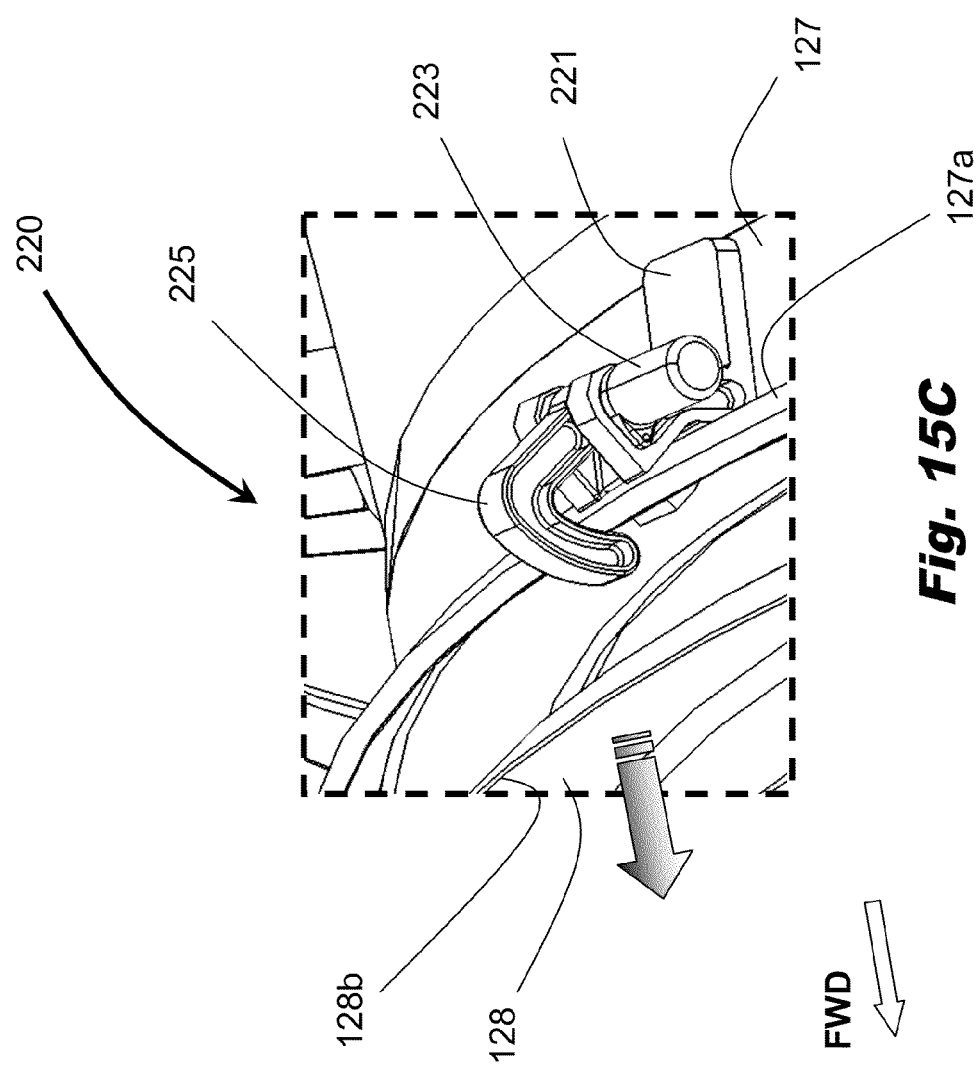

An alternative electromechanical latch 220 for selectively securing the inlet lip 128 to the inner barrel 127 is shown in FIGS. 15A-15C. In this embodiment, each latch 220 includes a catch 225 pivotally mounted on a bracket 221. The bracket 221 is attached to the inner barrel 127 proximate to the inner barrel's forward edge 127a. An electrical actuator 223 such as a rotary solenoid controls movement and positioning of the catch 225 between the latched position shown in FIG. 15A and the fully unlatched positions shown in FIGS. 15B and 15C. A plurality of electromechanical latches 220 can be circumferentially spaced around the joint 101 between the forward edge 127a of the inlet inner barrel 127 and the aft inner edge 128b of the inlet lip 128.

Figure 16:
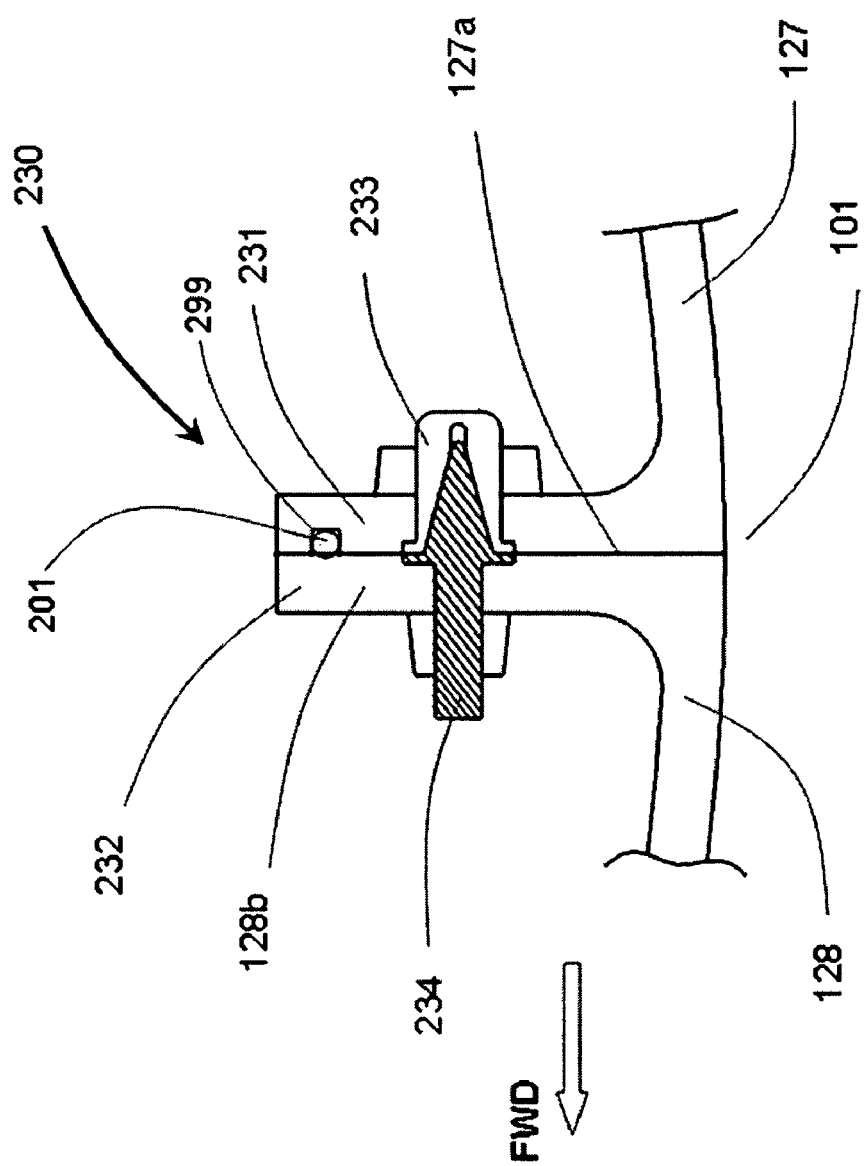
FIG. 16 is a longitudinal cross-sectional view of one embodiment of a mating interface between an aft edge of a movable inlet lip and a forward edge of a stationary inner barrel.
Figure 17:
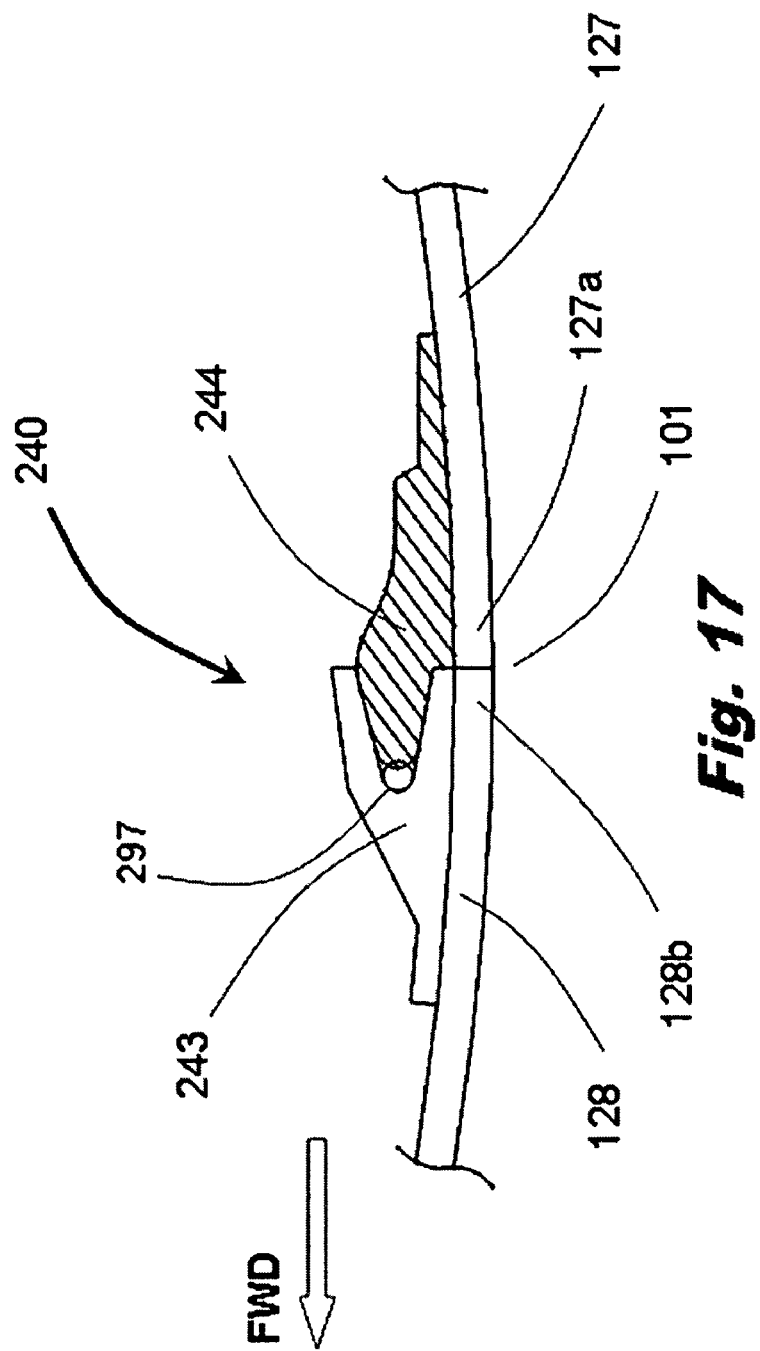
FIG. 17 is a longitudinal cross-sectional view of another embodiment of a mating interface between an aft edge of a movable inlet lip and a forward edge of a stationary inner barrel.
Figure 18:
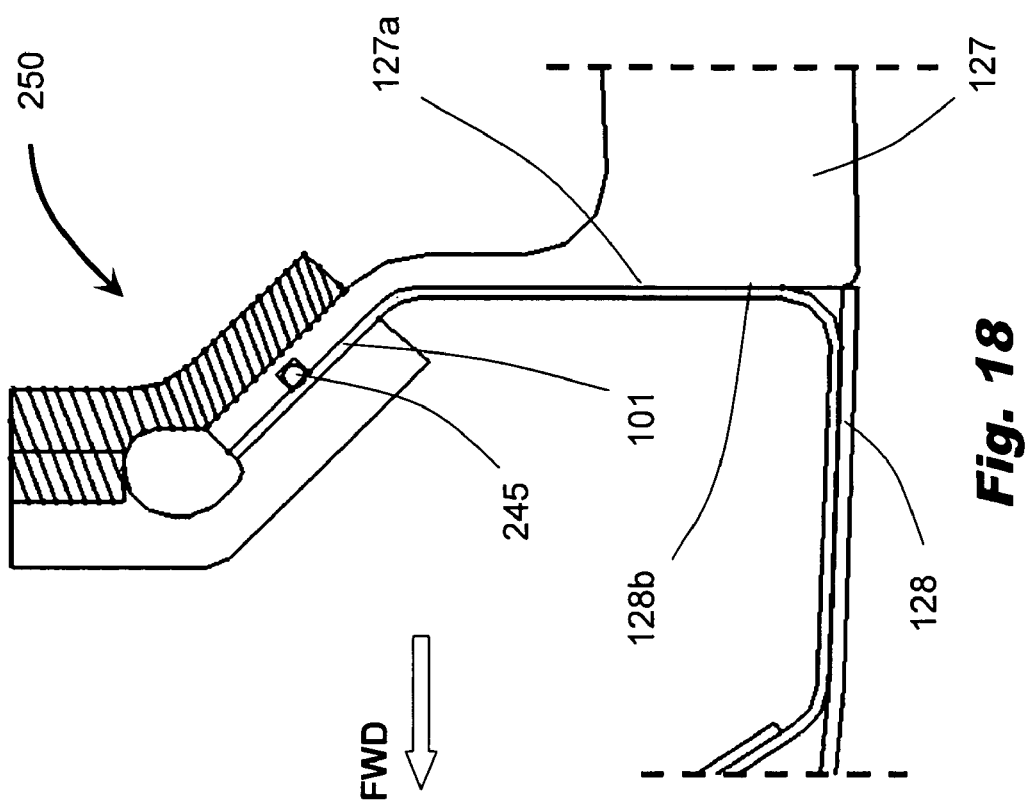
FIG. 18 is a longitudinal cross-sectional view of yet another embodiment of a mating interface between an aft edge of a movable inlet lip and a forward edge of a stationary inner barrel.

FIGS. 16-18 show two embodiments of a substantially air-tight and aligned interface along the joint 101 between the forward edge 127a of the inlet inner barrel 127 and the aft inner edge 128b of the inlet lip 128 when the translating inlet cowl 124 is in its stowed flight position (as shown in FIG. 3A). In the interface arrangement 230 shown in FIG. 16, the inlet inner barrel 127 includes a first flange 231, and the inlet lip 128 includes a corresponding second flange 232. The first flange 231 can include a plurality of receptacles 233 distributed evenly around the forward joint 101, and the second flange 232 can include a plurality of tapered pins 234 that align the lip 128 and the inner barrel 127 when the nacelle is in its flight configuration. A seal member 201 of a resilient material such as rubber can be provided within a circumferential cavity 299 in the first flange 231. The seal 201 can be compressed against the adjacent surface of the second flange 232 to provide an aerodynamic seal when the inlet cowl 124 is in its stowed flight position. In the interface arrangement 240 shown in FIG. 17, a female member 243 on the aft edge 128b of the inlet lip 128 receives a male member 244 on the forward edge 127a of the inner barrel 127. In this embodiment 240, neither the inlet lip 128 nor the inner barrel 127 requires an upstanding flange. A seal 297 of a resilient material such as rubber, for example, can be disposed between the tip of male member 244 and the bottom of the recess in female member 243. The seal 297 can be compressed between the male and female members 243, 244 to provide an aerodynamic seal when the inlet cowl 124 is in its stowed flight position.

In another interface configuration 250 shown in FIG. 18, the aft edge 128b of the inlet lip 128 can have a conical shape, and can mate with a conically shaped forward edge 127a of the inner barrel 127. When the inlet cowl 124 is in its stowed flight position, the edges 128b, 127a align to provide an aerodynamic joint 101. A seal 245 can be installed between the mating conical edges 128b, 127a to aerodynamically seal the joint 101.

Affixing the inner barrel 127 to the fan case 116 in a stationary position (as shown in FIG. 3B) provides a strong, durable and efficient structure that enhances the ability of the inner barrel 127 and the fan case 116 to endure a blade out event, and to support an aircraft's subsequent fly home capability. The translating nacelle structure described above also provides substantial reductions in weight that benefit aircraft efficiency. In the embodiments described above, for example, the nacelle structure can be approximately 40-50 pounds lighter than a comparable nacelle structure like that described in U.S. Pat. No. 6,340,135.

The above descriptions of embodiments of the invention are intended to describe various aspects and features of the invention, and are not intended to limit the scope of the invention thereto. Persons of ordinary skill in the art will understand that certain changes and modifications can be made to the described embodiments without departing from the scope of the invention. All such changes and modifications are intended to be within the scope of the appended claims.

What is claimed is:

1. A nacelle for a turbofan aircraft engine having a fan case with a fan case forward edge, the nacelle comprising:
   (a) an inlet inner barrel having an inner barrel forward edge and an inner barrel aft edge, the inner barrel aft edge being configured to be affixed to the fan case forward edge in a stationary position on the engine;
   (b) a translating inlet cowl having an inlet lip with an aft inlet lip edge and an outer skin with rear edge, the inlet cowl configured to be selectively movable in the forward and aft directions relative to the fan case, between a stowed flight position and an extended service position;
   c) at least two circumferentially spaced actuators constructed and arranged to generate an output for causing the translating inlet cowl to move in the forward and aft directions; and d) a plurality of electromechanical latches circumferentially spaced around the inner barrel forward edge and configured to engage an aft inner edge periphery of the inlet lip in the stowed flight position and to disengage from the inlet lip in the extended service position, each of the latches having an electrical actuator.

2. A nacelle for a turbofan aircraft engine according to claim 1, wherein:
each electromechanical latch includes a catch mounted on a bracket;
each bracket is attached to the inlet inner barrel proximate to the inner barrel forward edge; and
each electrical actuator comprises a solenoid to control movement and positioning of the catch.

3. A nacelle for a turbofan aircraft engine according to claim 2, wherein:
the catch is pivotally mounted on the bracket; and
the solenoid is a rotary solenoid.

4. A nacelle for a turbofan aircraft engine according to claim 1 further comprising a stationary aft nacelle portion having a front edge, wherein a service opening is formed between the rear edge of the outer skin and the front edge of the aft nacelle portion when the translating inlet cowl is in the extended service position, the service opening being proximate to the engine fan case.

5. A nacelle for a turbofan aircraft engine according to claim 1 further comprising a synchronizing cable connected to the at least two circumferentially spaced actuators and configured to ensure that the actuators generate a synchronized output.

6. A nacelle for a turbofan aircraft engine according to claim 5 wherein;
the at least two circumferentially spaced actuators each comprise a ball screw extending between a forward ball screw support and an aft ball screw support;
rotation of the ball screws causes the inlet cowl to translate in the forward and aft directions; and
the synchronizing cable ensures that the ball screws rotate in synchrony.

7. A nacelle for a turbofan aircraft engine according to claim 1 further comprising mating seal members on the inner barrel forward edge and the inlet lip aft inner edge that sealingly engage each other when the translating inlet cowl is in the stowed flight position.

8. A nacelle for a turbofan aircraft engine according to claim 1 further comprising at least one stabilizing beam for movably attaching the translating inlet cowl to one or more stationary portions of the engine.

9. A nacelle for a turbofan aircraft engine according to claim 1 further comprising mating fittings on the inner barrel forward edge and the inlet lip aft inner edge that engage each other when the translating inlet cowl is in the stowed flight position.

10. A nacelle for a turbofan aircraft engine having a fan case with a fan case forward edge, the nacelle comprising:
(a) a translating inlet cowl comprising an inlet lip with an inlet lip aft inner edge and an outer skin with a rear edge, the translating inlet cowl being movable in the forward and aft directions relative to the fan case between a stowed flight position and an extended service position;
(b) a stationary aft nacelle portion including a front outer edge;
(c) an inlet inner barrel having an inner barrel forward edge and an inner barrel aft edge, wherein the inner barrel aft edge is configured to be affixed to the fan case forward edge in a stationary position;
(d) at least two circumferentially spaced actuators constructed and arranged to generate an output for causing the translating inlet cowl to move in the forward and aft directions; and
(e) a plurality of electromechanical latches circumferentially spaced around the inner barrel forward edge and configured to engage an aft inner edge periphery of the inlet lip in the stowed flight position and to disengage from the inlet lip in the extended service position, each of the latches having an electrical actuator;
wherein the inlet lip aft inner edge is adjacent to the inner barrel forward edge when the translating inlet cowl is in the stowed flight position, and
wherein a service opening is formed between the rear edge of the outer skin and the front edge of the aft nacelle portion when the translating inlet cowl is in the extended service position.

11. A nacelle for a turbofan aircraft engine according to claim 10 wherein
each electromechanical latch includes a catch mounted on a bracket;
each bracket is attached to the inlet inner barrel proximate to the inner barrel forward edge; and
the electrical actuator comprises a solenoid to control movement and positioning of the catch.

12. A nacelle for a turbofan aircraft engine according to claim 11, wherein:
the catch is pivotally mounted on the bracket; and
the solenoid is a rotary solenoid.

13. A nacelle for a turbofan aircraft engine according to claim 10 wherein the engine includes a pylon, and wherein the translating inlet cowl is at least partially movably supported by the pylon.

14. A nacelle for a turbofan aircraft engine according to claim 10 wherein the translating inlet cowl is at least partially movably supported by the fan case.

15. A nacelle for a turbofan aircraft engine according to claim 10 wherein the at least two circumferentially spaced actuators each comprise a ball screw extending between a forward ball screw support and an aft ball screw support, and wherein rotation of the ball screws causes the inlet cowl to translate in the forward and aft directions.

16. A nacelle for a turbofan aircraft engine according to claim 15 further comprising a synchronizing cable configured between ball screw supports to ensure that the actuators generate a synchronized output and the ball screws rotate in synchrony.

17. A nacelle for a turbofan aircraft engine according to claim 16 wherein the plurality of latches are configured to automatically latch the inlet lip aft inner edge to the inner barrel forward edge when the translating inlet cowl portion is moved from the extended service position to the stowed flight position.

18. A nacelle for a turbofan aircraft engine according to claim 10 further comprising a support beam having a fixed portion affixed to one or more stationary portions of the engine, and a movable portion affixed to the translating inlet cowl.

19. A nacelle for a turbofan aircraft engine according to claim 18 further comprising at least one stabilizing beam disposed between the translating inlet cowl and a stationary portion of the engine.

20. A nacelle for a turbofan aircraft engine according to claim 10 further comprising:
a first flange on the inlet inner barrel in abutment with a second flange on the inlet lip;

a seal member between the first flange and the second flange; and a plurality of pins for aligning the inlet inner barrel with the inlet lip.

21. A nacelle for a turbofan aircraft engine according to claim 10 wherein the service opening is proximate to the engine fan case.

22. A nacelle for a turbofan aircraft engine according to claim 10 further comprising mating fittings on the inner barrel forward edge and the inlet lip aft inner edge that engage each other when the translating inlet cowl is in the stowed flight position.

23. A nacelle for a turbofan aircraft engine having a fan case, the nacelle comprising:
    (a) a translating inlet cowl;
    (b) a support beam affixed to the engine fan case, wherein the support beam substantially supports the translating inlet cowl on the engine, and is configured to permit the translating inlet cowl to be selectively translated in the forward and aft directions relative to the fan case between a stowed flight position and an extended service position;
    (c) an inner barrel connected to the fan case in a fixed position forward of the fan case, the inner barrel including an inner barrel forward edge, wherein the translating inlet cowl includes an inlet lip with an aft inner edge that engages the inner barrel forward edge when the inlet cowl is in the stowed flight position, and wherein the aft inner edge of the inlet lip is separate from the inner barrel forward edge when the inlet cowl is in the extended service position;
    (d) at least two circumferentially spaced actuators constructed and arranged to generate a synchronized output for causing the translating inlet cowl to move in the forward and aft directions; and
    (e) a plurality of electromechanical latches circumferentially spaced around the inner barrel forward edge and configured to engage an aft inner edge periphery of the inlet lip in the stowed flight position and to disengage from the inlet lip in the extended service position, each of the latches having an electrical actuator.

24. A nacelle for a turbofan aircraft engine according to claim 23 wherein the support beam includes a stationary beam portion affixed to the engine fan case and at least one sliding portion slidably engaged on the support beam and affixed to the translating inlet cowl.

25. A nacelle for a turbofan aircraft engine according to claim 23 further comprising a separable seal between the inner barrel forward edge and the aft inner edge of the inner barrel.

26. A nacelle for a turbofan aircraft engine according to claim 23
    wherein the at least two circumferentially spaced actuators each comprise a ball screw extending between a forward ball screw support and an aft ball screw support, and wherein rotation of the ball screws causes the inlet cowl to translate in the forward and aft directions.

27. A nacelle for a turbofan aircraft engine according to claim 26 further comprising a synchronizing cable configured between ball screw supports to ensure that the ball screws rotate in synchrony.

28. A nacelle for a turbofan aircraft engine according to claim 23 wherein
    each electromechanical latch includes a catch mounted on a bracket;
    each bracket is attached to the inlet inner barrel proximate to the inner barrel forward edge; and
    the electrical actuator comprises a solenoid to control movement and positioning of the catch.

29. A nacelle for a turbofan aircraft engine according to claim 28, wherein:
    the catch is pivotally mounted on the bracket; and
    the solenoid is a rotary solenoid.

* * * * *